United States Patent
Li et al.

(10) Patent No.: US 12,160,564 B2
(45) Date of Patent: Dec. 3, 2024

(54) BILATERAL MATCHING WITH AFFINE MOTION

(71) Applicant: Tencent America LLC, Palo Alto, CA (US)

(72) Inventors: Xiang Li, Saratoga, CA (US); Guichun Li, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 208 days.

(21) Appl. No.: 17/951,900

(22) Filed: Sep. 23, 2022

(65) Prior Publication Data

US 2023/0328225 A1    Oct. 12, 2023

Related U.S. Application Data

(60) Provisional application No. 63/329,835, filed on Apr. 11, 2022.

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/172* (2014.11);
(Continued)

(58) Field of Classification Search
CPC .. H04N 19/105; H04N 19/139; H04N 19/172; H04N 19/176; H04N 19/52; H04N 19/577
See application file for complete search history.

(56) References Cited

U.S. PATENT DOCUMENTS

| 11,202,089 | B2 | 12/2021 | Li et al. |
| 2016/0286230 | A1 | 9/2016 | Li et al. |

(Continued)

FOREIGN PATENT DOCUMENTS

| WO | 2017084512 A1 | 5/2017 |
| WO | 2018105582 A1 | 6/2018 |
| WO | 2020058886 A1 | 3/2020 |

OTHER PUBLICATIONS

International Search Report and Written Opinion issued Jan. 5, 2023 in Application No. PCT/US2022/77130, 8 pages.

(Continued)

*Primary Examiner* — Jeremiah C Hallenbeck-Huber
(74) *Attorney, Agent, or Firm* — ArentFox Schiff LLP

(57) ABSTRACT

Prediction information of a current block in a current picture is decoded from a coded video bitstream, where the prediction information indicates that the current block is to be predicted based on an affine model. A plurality of affine motion parameters of the affine model is derived via affine bilateral matching in which the affine model is derived based on reference blocks in a first reference picture and a second reference picture of the current picture. The plurality of affine motion parameters is not included in the coded video bitstream. Control point motion vectors of the affine model are determined based on the derived plurality of affine motion parameters. The current block is reconstructed based on the derived affine model.

20 Claims, 22 Drawing Sheets

(51) Int. Cl.
*H04N 19/172* (2014.01)
*H04N 19/176* (2014.01)
*H04N 19/52* (2014.01)
*H04N 19/577* (2014.01)

(52) U.S. Cl.
CPC ........... *H04N 19/176* (2014.11); *H04N 19/52* (2014.11); *H04N 19/577* (2014.11)

(56) References Cited

U.S. PATENT DOCUMENTS

| | | | | |
|---|---|---|---|---|
| 2019/0364295 A1* | 11/2019 | Li | .......................... | H04N 19/176 |
| 2020/0236383 A1* | 7/2020 | Li | .......................... | H04N 19/176 |
| 2020/0404253 A1* | 12/2020 | Chen | ....................... | B23P 15/00 |
| 2021/0274209 A1* | 9/2021 | He | .......................... | H04N 19/52 |
| 2022/0078488 A1* | 3/2022 | Leleannec | ............ | H04N 19/105 |
| 2022/0150505 A1* | 5/2022 | Luo | ....................... | H04N 19/137 |
| 2022/0182657 A1* | 6/2022 | Yang | .................... | H04N 19/172 |
| 2022/0224911 A1* | 7/2022 | Park | ...................... | H04N 19/109 |
| 2023/0344984 A1* | 10/2023 | Li | .......................... | H04N 19/105 |
| 2023/0362403 A1* | 11/2023 | Lo | .......................... | H04N 19/176 |

OTHER PUBLICATIONS

High Efficiency Video Coding, Rec. ITU-T H.265 v4 Dec. 2016, pp. 1-664.

B. Bross, S. Liu, et al., "Versatile Video Coding Editorial Refinements on Draft 10", JVET-T2001, ITU-T SG 16 WP 3 and ISO/IEC JTC 1/SC 29/WG 11, Oct. 2020, pp. 1-511.

J. Chen, et al., "Algorithm description for Versatile Video Coding and Test Model 10 (VTM 10)", JVET-S2002, ITU-T SG 16 WP 3 and ISO/IEC JTC 1/SC 29/WG 11, Jul. 2020, pp. 1-97.

* cited by examiner

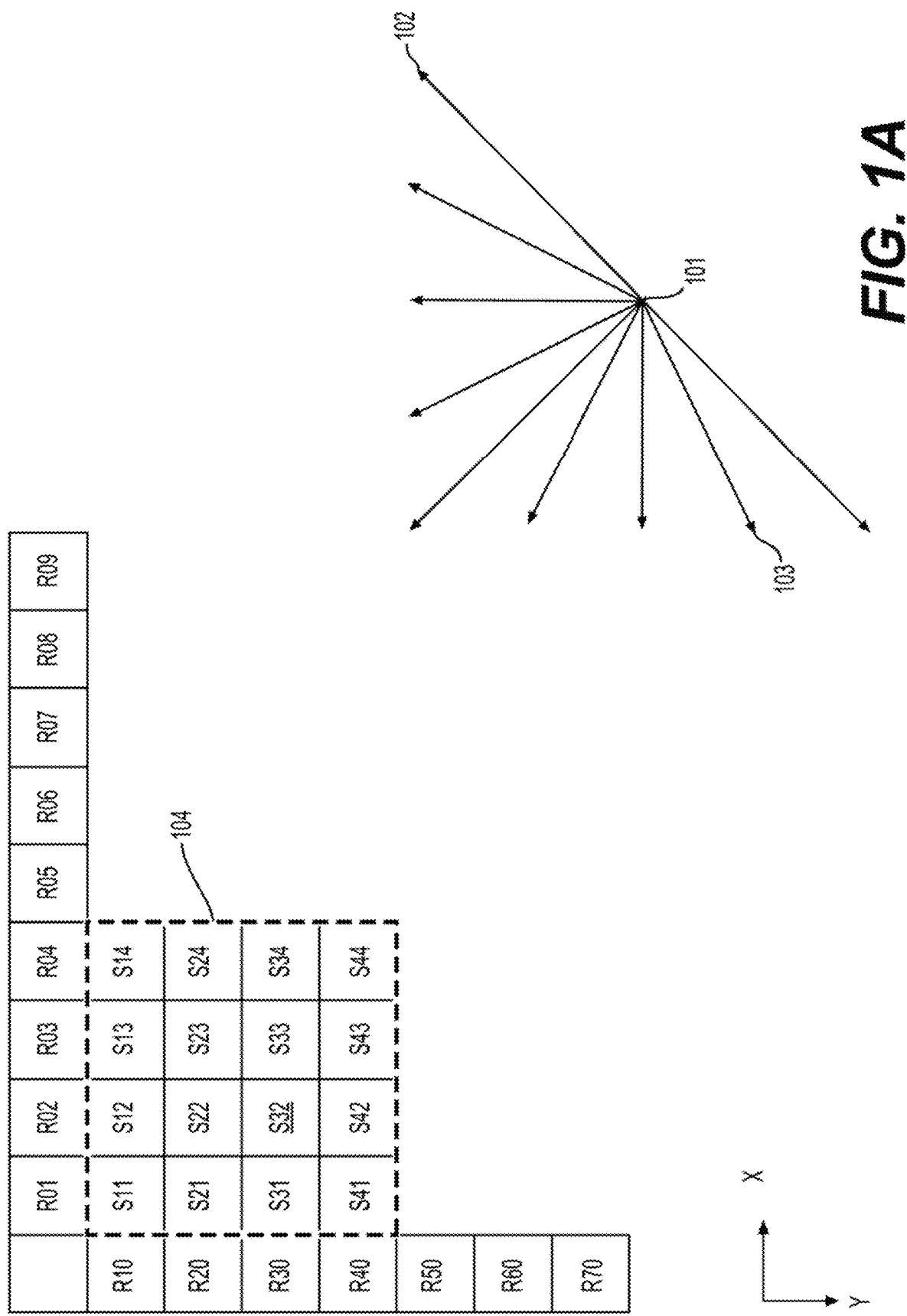

BILATERAL MATCHING WITH AFFINE MOTION

INCORPORATION BY REFERENCE

The present application claims the benefit of priority to U.S. Provisional Application No. 63/329,835, "Bilateral Matching with Affine Motion" filed on Apr. 11, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry.

According to an aspect of the disclosure, a method of video decoding performed in a video decoder is provided. In the method, prediction information of a current block in a current picture can be decoded from a coded video bitstream, where the prediction information can indicate that the current block is to be predicted based on an affine model. A plurality of affine motion parameters of the affine model can be derived via affine bilateral matching in which the affine model is derived based on reference blocks in a first reference picture and a second reference picture of the current picture. The plurality of affine motion parameters may not be included in the coded video bitstream. Control point motion vectors of the affine model can be determined based on the derived plurality of affine motion parameters. The current block can be reconstructed based on the derived affine model.

The plurality of affine motion parameters of the affine model can be derived based on a reference block pair from a plurality of candidate reference block pairs of the reference blocks in the first reference picture and the second reference picture. The reference block pair can include a first reference block in the first reference picture and a second reference block in the second reference picture based on a constraint of the affine model and a cost value. The constraint can be associated with a temporal distance ratio that is based on (i) a first temporal distance between the current picture and the first reference picture and (ii) a second temporal distance between the current picture and the second reference picture. The cost value can be based on a difference between the first reference block and the second reference block.

In some embodiments, the temporal distance ratio can be equal to a product of a weight factor and a ratio of (i) the first temporal distance between the current picture and the first reference picture and (ii) the second temporal distance between the current picture and the second reference picture, where the weight factor can be a positive integer.

In some embodiments, the constraint of the affine model can indicate that a first translational factor of a first affine motion vector from the current block to the first reference block is proportional to the temporal distance ratio. The constraint of the affine model can indicate that a second translational factor of a second affine motion vector from the current block to the second reference block is proportional to the temporal distance ratio.

In some embodiments, the constraint of the affine model further can indicate that a second zoom factor of a second affine motion vector from the current block to the second reference block is equal to a first zoom factor of a first affine motion vector from the current block to the first reference block to a power of the temporal distance ratio.

In some embodiments, the constraint of the affine model can indicate that a ratio of (i) a first delta zoom factor of a first affine motion vector from the current block to the first reference block and (ii) a second delta zoom factor of a second affine motion vector from the current block to the second reference block is equal to the temporal distance ratio. The first delta zoom factor can be equal to a first zoom factor minus one, and the second delta zoom factor can be equal to a second zoom factor minus one.

In some embodiments, the constraint of the affine model can further indicate that a ratio of (i) a first rotation angle of a first affine motion vector from the current block to the first reference block and (ii) a second rotation angle of a second affine motion vector from the current block to the second reference block is equal to the temporal distance ratio.

To determine the reference block pair, the plurality of candidate reference block pairs can be determined according to the constraint of the affine model. Each candidate reference block pair of the plurality of candidate reference block pairs can include a respective candidate reference block in the first reference picture and a respective candidate reference block in the second reference picture. A respective cost value can be determined for each candidate reference block pair of the plurality of candidate reference block pairs. The reference block pair associated with a minimum cost value can be determined as a candidate reference block pair of the plurality of candidate reference block pairs.

In some embodiments, the plurality of candidate reference block pairs can include a first candidate reference block pair, where the first candidate reference block pair can include a first candidate reference block in the first reference picture and a first candidate reference block in the second reference picture. To determine the reference block pair, an initial predictor associated with the first reference picture for the current block can be determined based on an initial reference block in the first reference picture. An initial predictor associated with the second reference picture for the current block can be determined based on an initial reference block in the second reference picture. A first predictor associated with the first reference picture for the current block can be determined based on the initial predictor associated with the first reference picture for the current block, where the first predictor associated with the first reference picture for the current block can be associated with the first candidate reference block in the first reference picture. A first predictor associated with the second reference picture for the current block can be determined based on the initial predictor associated with the second reference picture for the current block, where the first predictor associated with the second reference picture for the current block can be associated with the first candidate reference block in the second reference picture. A first cost value can be determined based on a difference between the first predictor associated with the first reference picture for the current block and the first predictor associated with the second reference picture for the current block.

In the method, the initial predictor associated with the first reference picture for the current block can be indicated by one of a merge index, an advanced motion vector prediction (AMVP) predictor index, and an affine merge index.

To determine the first predictor associated with the first reference picture for the current block, a first component of a gradient value of the initial predictor associated with the first reference picture for the current block in a first direction can be determined. A second component of the gradient value of the initial predictor associated with the first reference picture for the current block in a second direction can be determined. The second direction can be perpendicular to the first direction. A first component of a displacement between the initial reference block in the first reference picture and the first candidate reference block in the first reference picture in the first direction can be determined. A second component of the displacement between the initial reference block in the first reference picture and the first candidate reference block in the first reference picture in the second direction can be determined. The first predictor associated with the first reference picture for the current block can be determined as equal to a sum of (i) the initial predictor associated with the first reference picture for the current block, (ii) a product of the first component of the gradient value of the initial predictor and the first component of the displacement, and (iii) a product of the second component of the gradient value of the initial predictor and the second component of the displacement.

The plurality of candidate reference block pairs can include an N-th candidate reference block pair, where the N-th candidate reference block pair can include an N-th candidate reference block in the first reference picture and an N-th candidate reference block in the second reference picture. To determine the reference block pair, an N-th predictor associated with the N-th candidate reference block in the first reference picture for the current block can be determined based on an (N−1)-th predictor associated with an (N−1)-th candidate reference block in the first reference picture for the current block. An N-th predictor associated with the N-th candidate reference picture for the current block can be determined based on an (N−1)-th predictor associated with an (N−1)-th candidate reference block in the second reference picture for the current block. An N-th cost value can be determined based on a difference between the N-th predictor associated with the first reference picture for the current block and the N-th predictor associated with the second reference picture for the current block.

To determine the N-th predictor associated with the first reference picture for the current block, a first component of a gradient value of the (N−1)-th predictor associated with the first reference picture for the current block in a first direction can be determined. A second component of the gradient value of the (N−1)-th predictor associated with the first reference picture for the current block in a second direction can be determined. The second direction can be perpendicular to the first direction. A first component of a displacement can be determined. The first component of the displacement can be a difference between the N-th candidate reference block in the first reference picture and the (N−1)-th candidate reference block in the first reference picture in the first direction. A second component of the displacement can be determined. The second component of the displacement can be a difference between the N-th candidate reference block in the first reference picture and the (N−1)-th candidate reference block in the first reference picture in the second direction. The N-th predictor can be determined based on the first reference picture for the current block as equal to a sum of (i) the (N−1)-th predictor associated with the first reference picture for the current block, (ii) a product of the first component of the gradient value of the (N−1)-th predictor and the first component of the displacement, and (iii) a product of the second component of the gradient value of the (N−1)-th predictor and the second component of the displacement.

In some embodiments, the plurality of candidate reference block pairs can include N candidate reference block pairs based on one of: (i) N is equal to an upper limit value, and (ii) a displacement between the N-th candidate reference block in the first reference picture and an (N+1)-th candidate reference block in the first reference picture is zero.

In some embodiments, a delta motion vector of each sub-block in the current block can be equal to or less than a threshold value.

The prediction information can include a flag that indicates whether the current block is predicted based on the affine bilateral matching with the affine model.

In the method, a candidate motion vector list for the affine model associated with the current block can be determined. The candidate motion vector list can include the control point motion vectors associated with the reference block pair.

According to another aspect of the disclosure, an apparatus is provided. The apparatus includes processing circuitry. The processing circuitry can be configured to perform any of the methods for video encoding/decoding.

Aspects of the disclosure also provide a non-transitory computer-readable medium storing instructions which when executed by a computer for video decoding cause the computer to perform any of the methods for video encoding/decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

DETAILED DESCRIPTION OF EMBODIMENTS

Figure 1B:
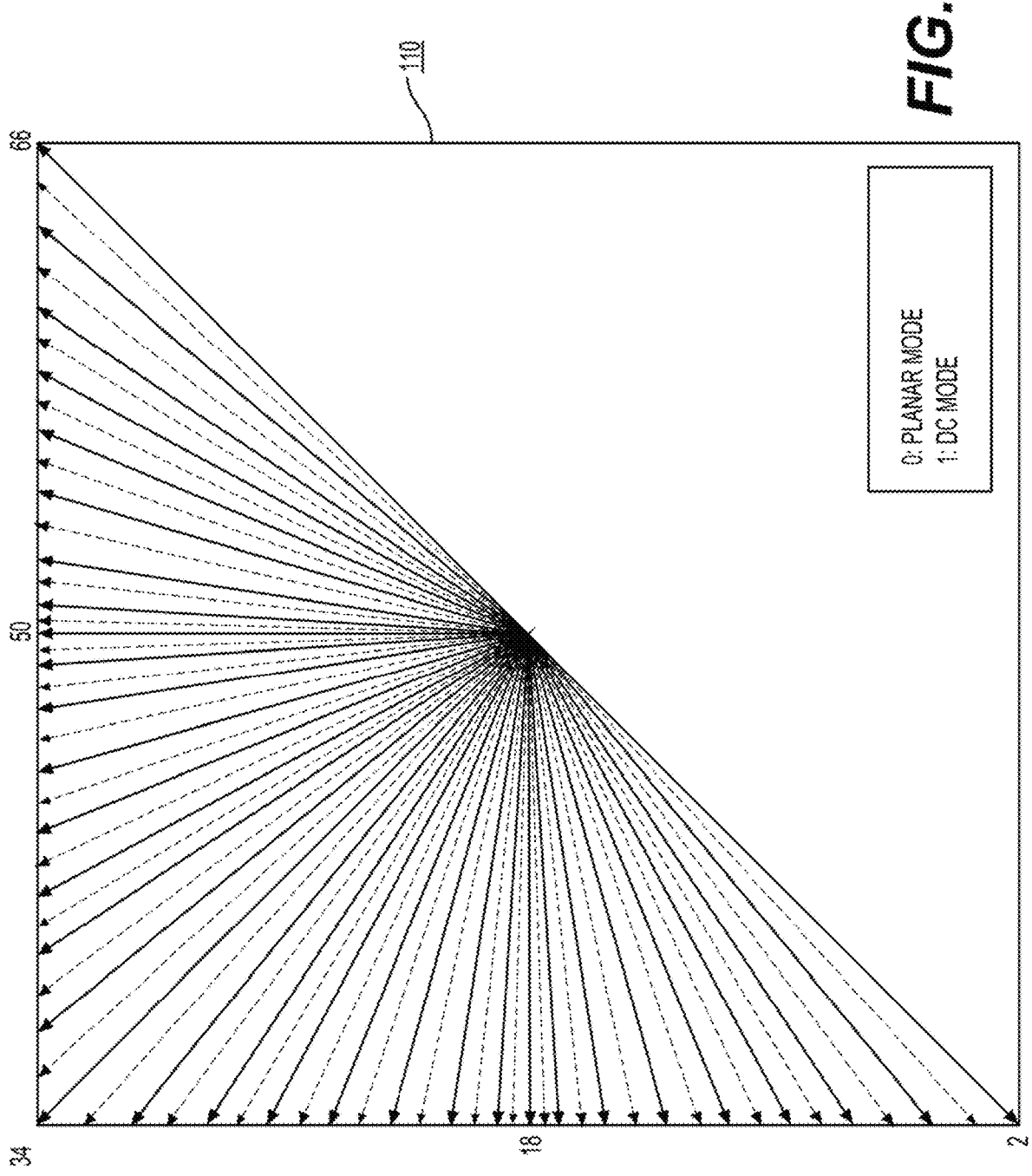
FIG. 1B is an illustration of exemplary intra prediction directions.
Figure 2:
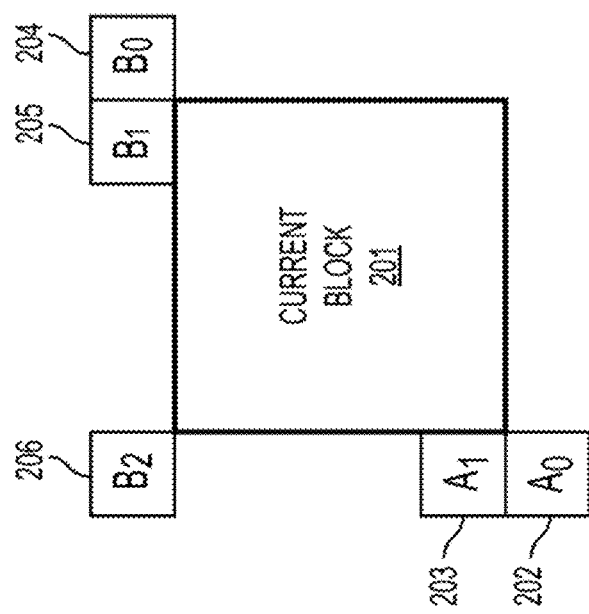
FIG. 2 is a schematic illustration of a current block and its surrounding spatial merge candidates in one example.
Figure 3:
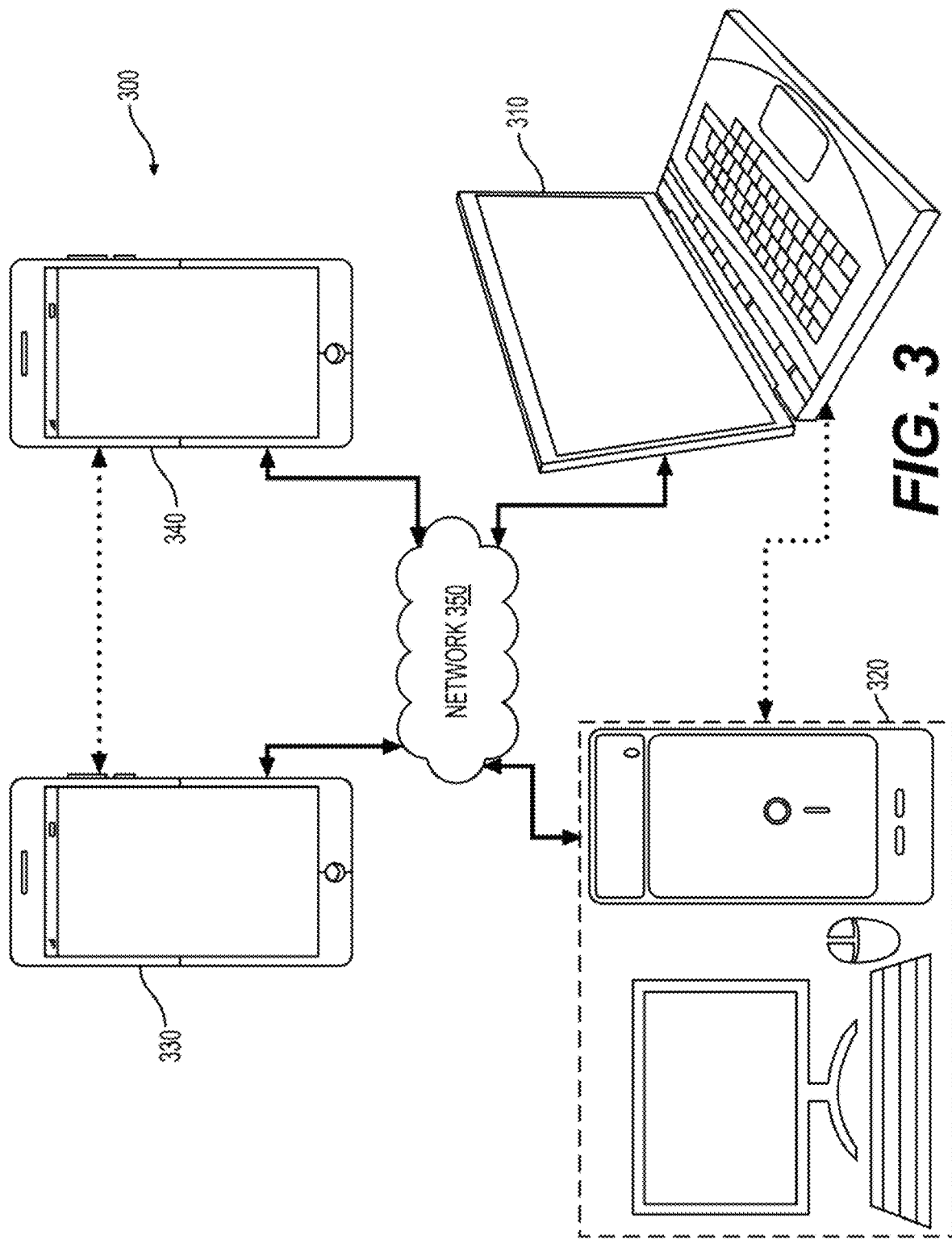
FIG. 3 is a schematic illustration of a simplified block diagram of a communication system (300) in accordance with an embodiment.

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
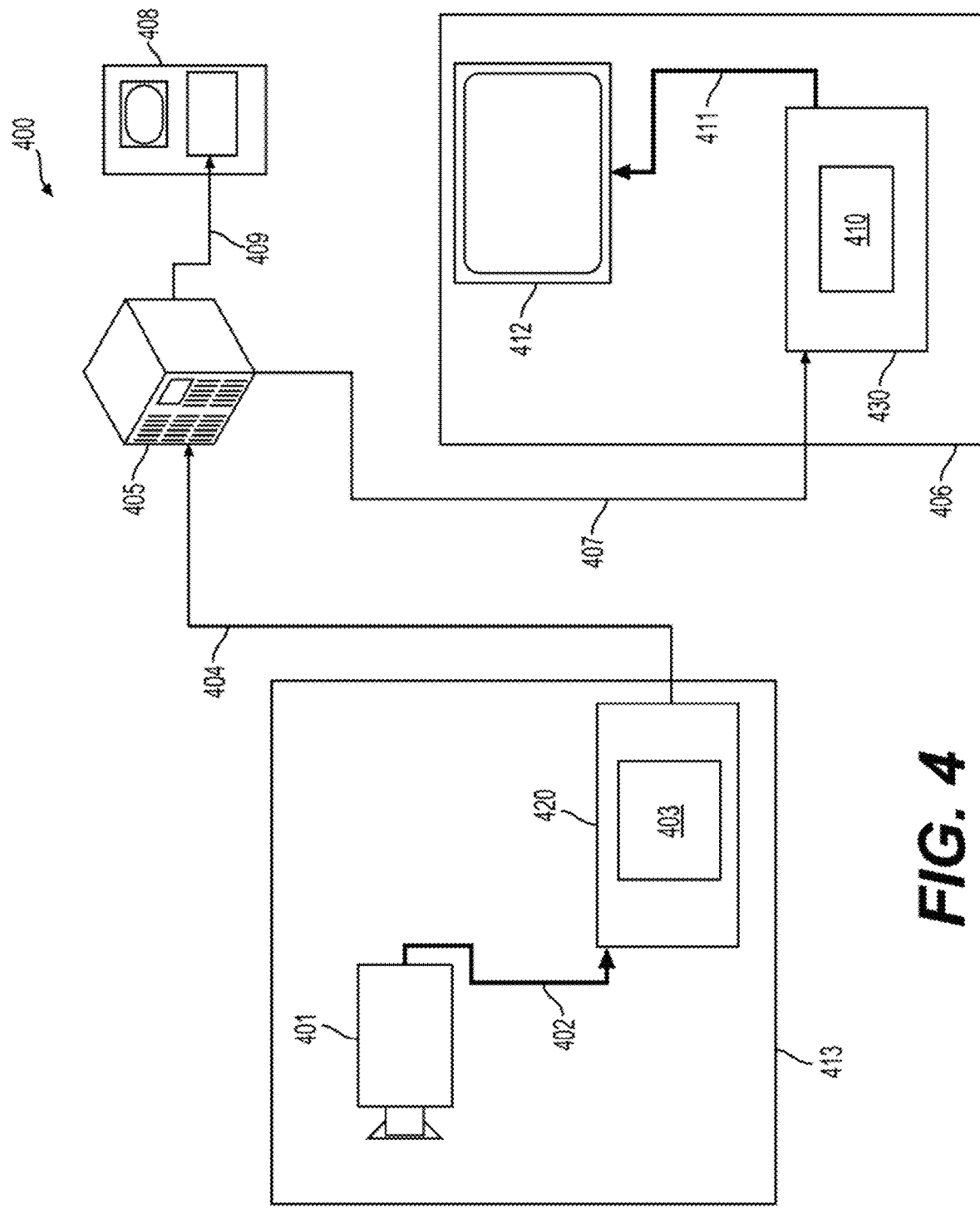
FIG. 4 is a schematic illustration of a simplified block diagram of a communication system (400) in accordance with an embodiment.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
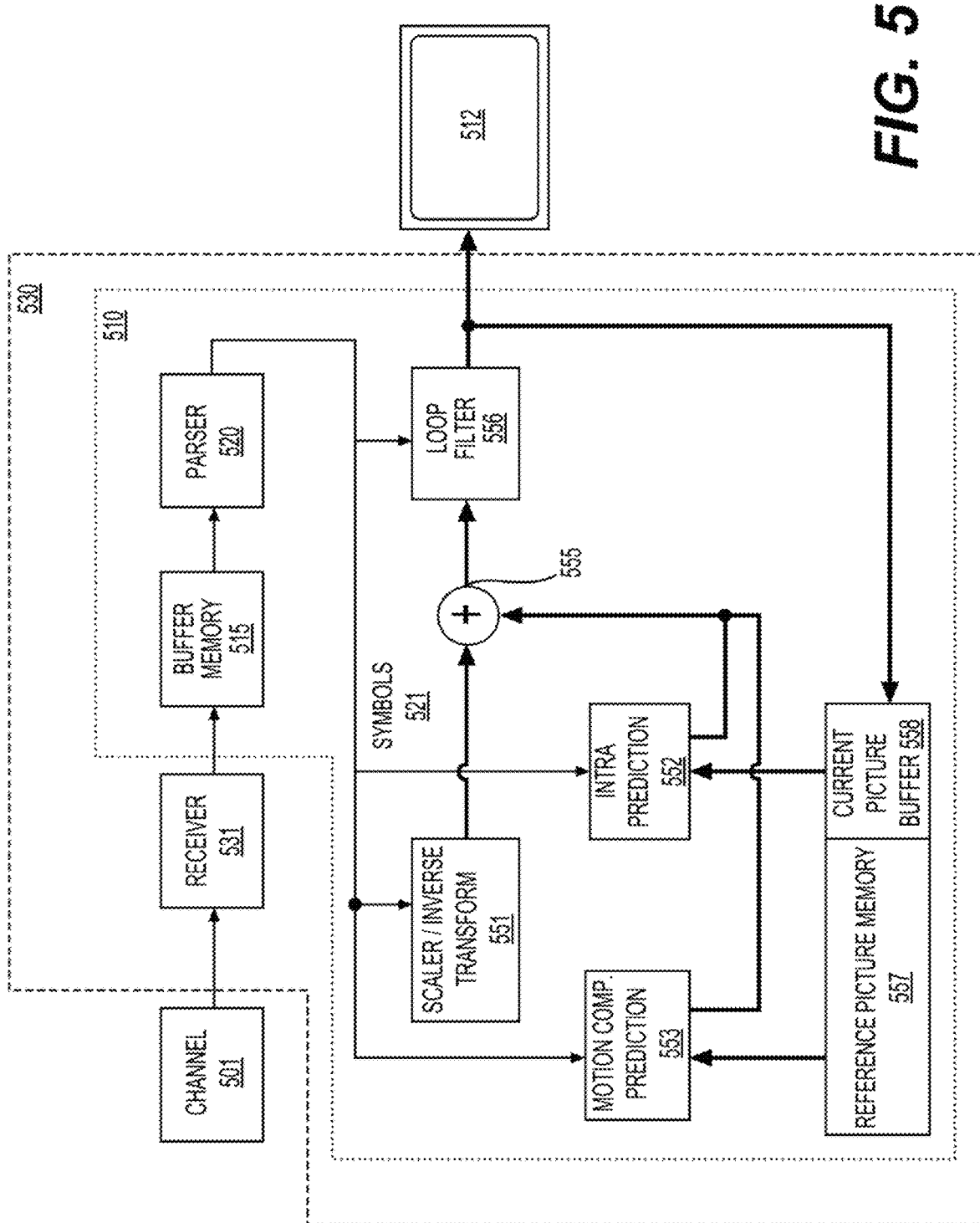
FIG. 5 is a schematic illustration of a simplified block diagram of a decoder in accordance with an embodiment.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
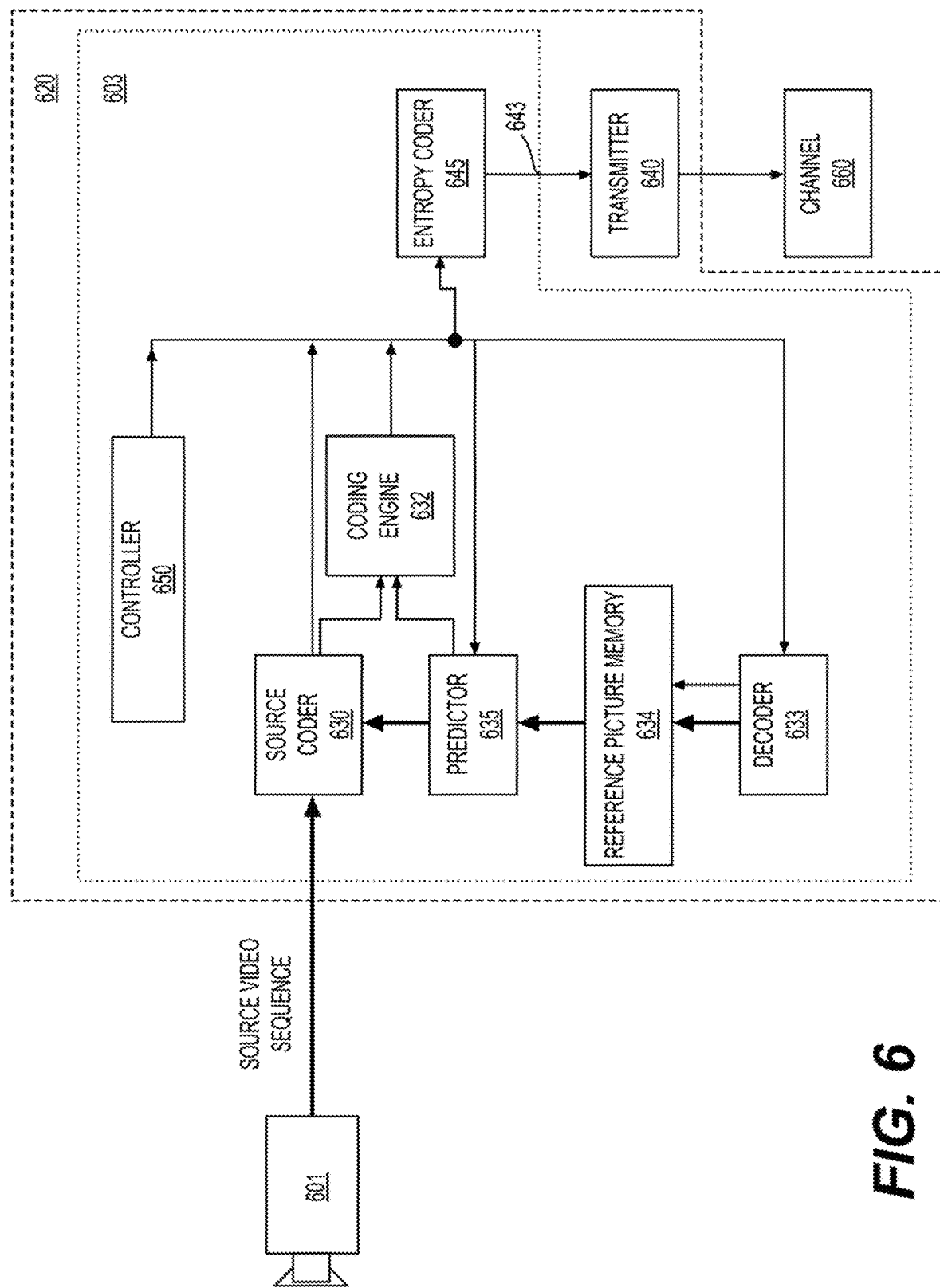
FIG. 6 is a schematic illustration of a simplified block diagram of an encoder in accordance with an embodiment.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction).

Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
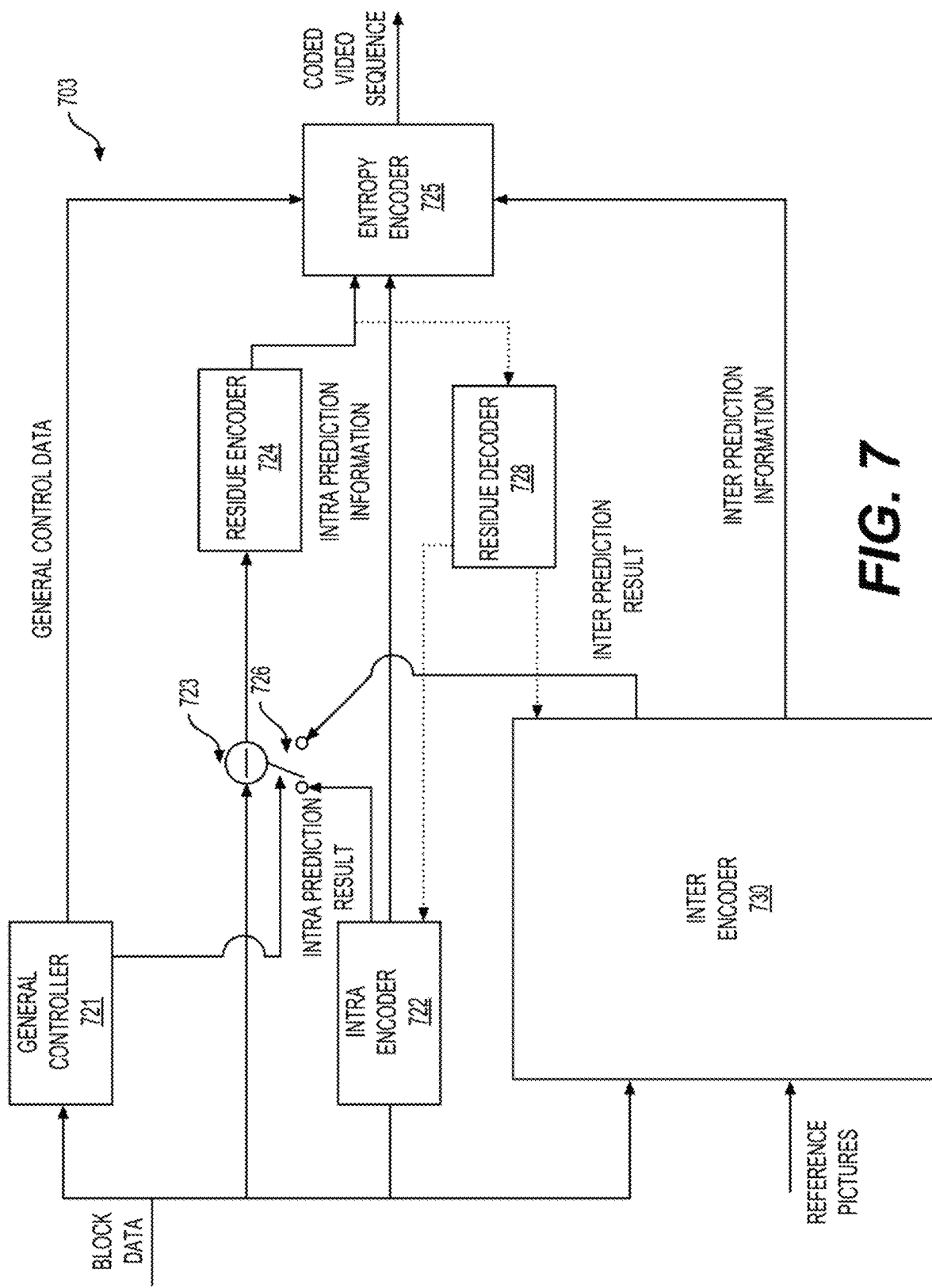
FIG. 7 shows a block diagram of an encoder in accordance with another embodiment.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
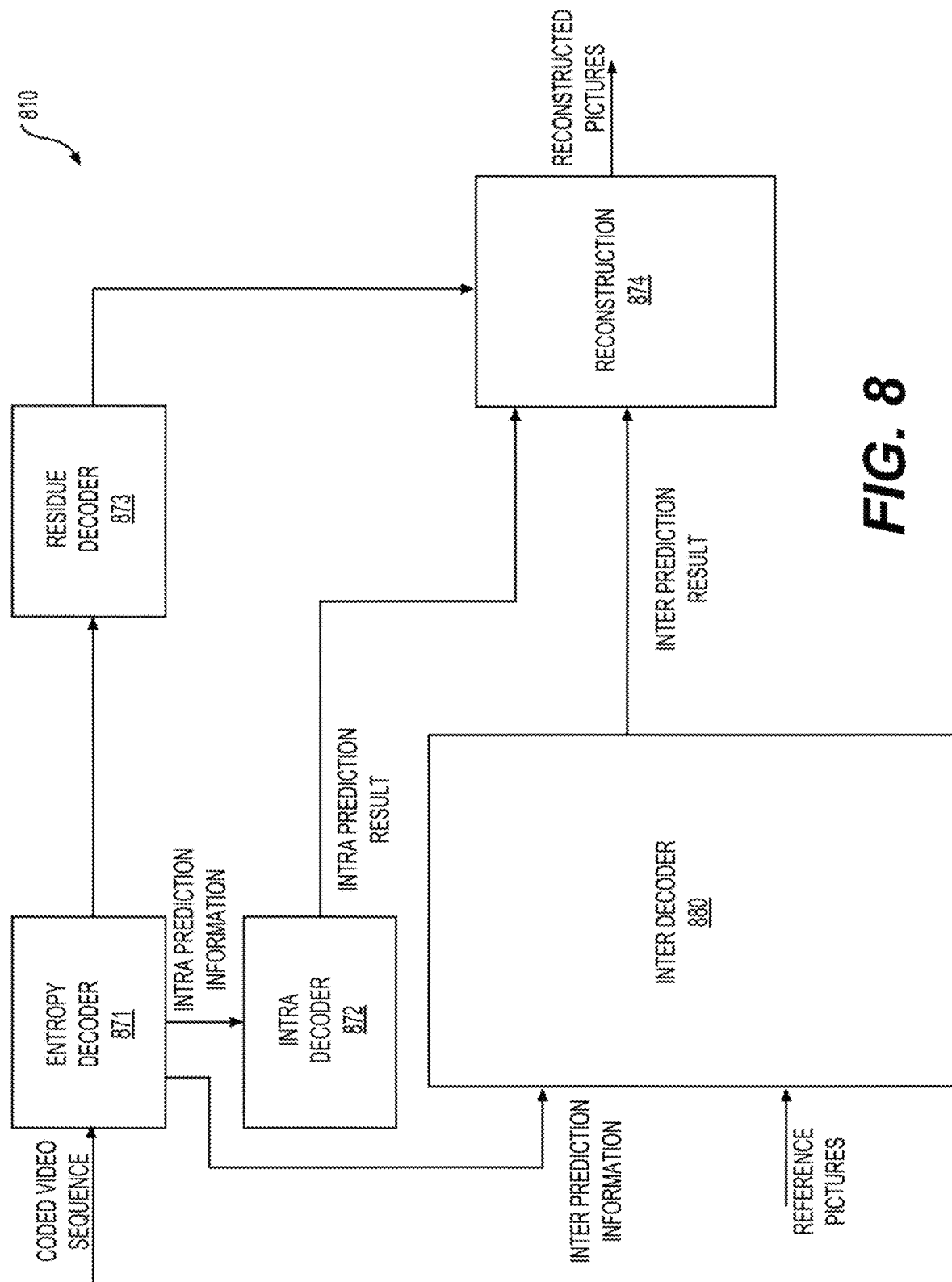
FIG. 8 shows a block diagram of a decoder in accordance with another embodiment.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

The disclosure includes embodiments related to an affine coding mode in which affine motion parameters of the affine coding mode can be derived based on bilateral matching instead of signaling.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). In 2015, the two standard organizations jointly formed JVET (Joint Video Exploration Team) to explore the potential of developing a next video coding standard beyond HEVC. In October 2017, the two standard organizations issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/ 10th JVET meeting. As a result of the meeting, JVET formally launched a standardization process of next-generation video coding beyond HEVC. The new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

In inter prediction, for each inter-predicted coding unit (CU), motion parameters are required for coding features of VVC, for example, to be used for the inter-predicted sample generation. The motion parameters can include motion vectors, reference picture indices, a reference picture list usage index, and/or additional information. The motion parameters can be signaled in an explicit or implicit manner. When a CU is coded with a skip mode, the CU can be associated with one PU, and a significant residual coefficient, a coded motion vector delta, and/or a reference picture index may not be required. When a CU is coded with a merge mode, the motion parameters for the CU can be obtained from neighboring CUs. The neighboring CUs can include spatial and temporal candidates, and additional schedules (or additional candidates) such as introduced in VVC. The merge mode can be applied to any inter-predicted CU, not only to skip mode. An alternative to the merge mode is an explicit transmission of motion parameters, where a motion vector, a corresponding reference picture index for each reference picture list, a reference picture list usage flag, and/or other needed information can be signaled explicitly per CU.

In VVC, a VVC Test model (VTM) reference software can include a number of new and refined inter prediction coding tools, which can include one or more of the following:

(1) Extended merge prediction
(2) Merge motion vector difference (MMVD)
(3) AMVP mode with symmetric MVD signalling
(4) Affine motion compensated prediction
(5) Subblock-based temporal motion vector prediction (SbTMVP)
(6) Adaptive motion vector resolution (AMVR)
(7) Motion field storage: 1/16th luma sample MV storage and 8×8 motion field compression
(8) Bi-prediction with CU-level weights (BCW)
(9) Bi-directional optical flow (BDOF)
(10) Decoder-side motion vector refinement (DMVR)
(11) Combined inter and intra prediction (CIIP)
(12) Geometric partitioning mode (GPM)

Figure 9B:
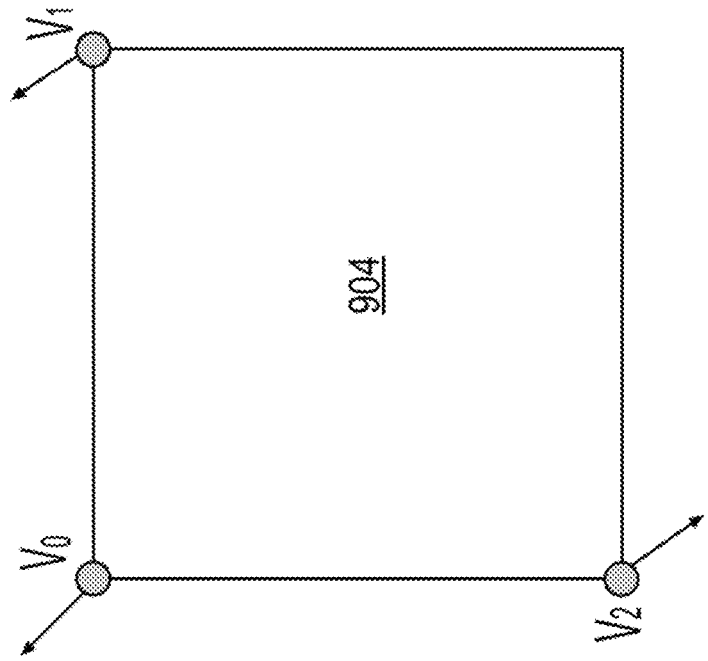
FIG. 9B shows a schematic illustration of a 6-parameter affine model in accordance with another embodiment.
Figure 9A:
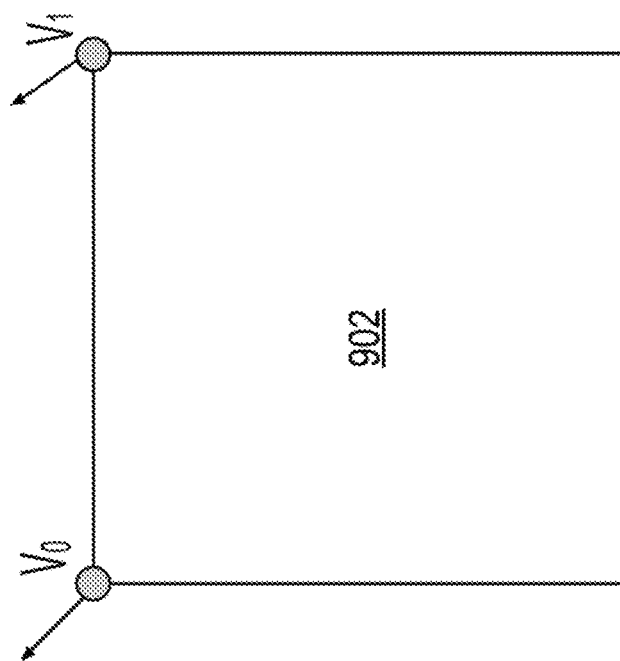
FIG. 9A shows a schematic illustration of a 4-parameter affine model in accordance with another embodiment.

In HEVC, a translation motion model is applied for motion compensation prediction (MCP). While in the real world, many kinds of motions can exist, such as zoom in/out, rotation, perspective motions, and other irregular motions. A block-based affine transform motion compensation prediction can be applied, such as in VTM. FIG. 9A shows an affine motion field of a block (902) described by motion information of two control points (4-parameter). FIG. 9B shows an affine motion field of a block (904) described by three control point motion vectors (6-parameter).

As shown in FIG. 9A, in the 4-parameter affine motion model, a motion vector at a sample location (x, y) in the block (902) can be derived in equation (1) as follows:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{Eq. (1)}$$

where $mv_x$ can be the motion vector in a first direction (or X direction) and $mv_y$ can be the motion vector in a second direction (or Y direction). The motion vector can also be described in equation (2):

$$\begin{cases} mv_x = ax + by + c \\ mv_y = -bx + ay + f \end{cases} \quad \text{Eq. (2)}$$

As shown in FIG. 9B, in the 6-parameter affine motion model, a motion vector at a sample location (x, y) in the block (904) can be derived in equation (3) as follows:

$$\begin{cases} mv_x = \dfrac{mv_{1x} - mv_{0x}}{W} x + \dfrac{mv_{2x} - mv_{0x}}{H} y + mv_{0x} \\ mv_y = \dfrac{mv_{1y} - mv_{0y}}{W} x + \dfrac{mv_{2y} - mv_{0y}}{H} y + mv_{0y} \end{cases} \quad \text{Eq. (3)}$$

The 6-parameter affine motion model can also described in equation (4) as follows:

$$\begin{cases} mv_x = ax + by + c \\ mv_y = dx + ey + f \end{cases} \quad \text{Eq. (4)}$$

As shown in equations (1) and (3), ($mv_{0x}$, $mv_{0y}$) can be a motion vector of a top-left corner control point. ($mv_{1x}$, $mv_{1y}$) can be motion vector of a top-right corner control point. ($mv_{2x}$, $mv_{2y}$) can be a motion vector of a bottom-left corner control point.

Figure 10:
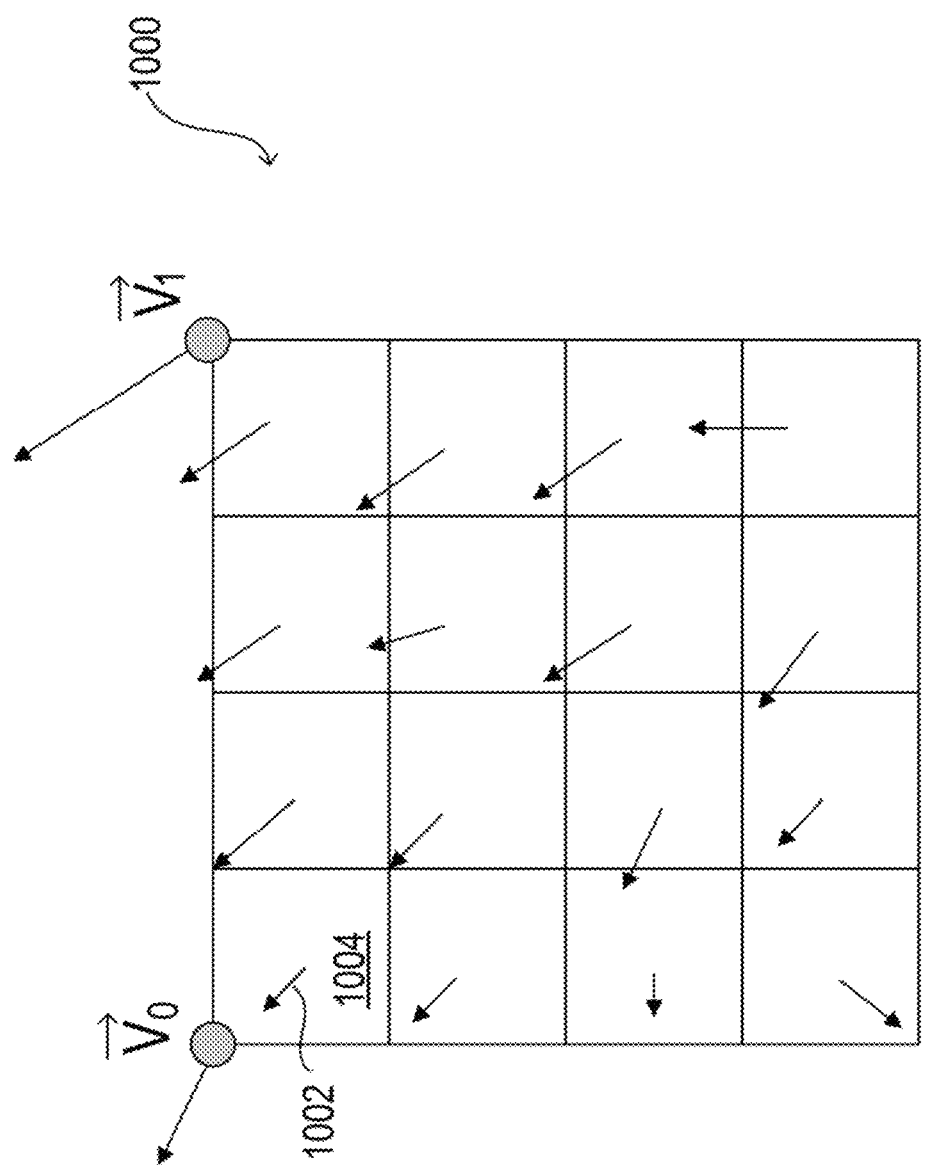
FIG. 10 shows a schematic illustration of an affine motion vector field associated with sub-blocks in a block in accordance with another embodiment.

As shown in FIG. 10, to simplify the motion compensation prediction, block based affine transform prediction can be applied. To derive a motion vector of each 4×4 luma sub-block, a motion vector of a center sample (e.g., (1002)) of each sub-block (e.g., (1004)) in a current block (1000) can be calculated according to the equations (1)-(4), and rounded to 1/16 fraction accuracy. Motion compensation interpolation filters can then be applied to generate the prediction of each sub-block with the derived motion vector. A sub-block size of chroma-components can also be set as 4×4. The MV of a 4×4 chroma sub-block can be calculated as an average of MVs of four corresponding 4×4 luma sub-blocks.

In affine merge prediction, an affine merge (AF_MERGE) mode can be applied for CUs with both a width and a height larger than or equal to 8. CPMVs of a current CU can be generated based on motion information of spatial neighboring CUs. Up to five CPMVP candidates can be applied for the affine merge prediction and an index can be signalled to indicate which one of the five CPMVP candidates can be used for the current CU. In affine merge prediction, three types of CPMV candidate can be used to form the affine merge candidate list: (1) inherited affine merge candidates that are extrapolated from CPMVs of neighbour CUs, (2) constructed affine merge candidates with CPMVPs that are derived using translational MVs of neighbour CUs, and (3) Zero MVs.

Figure 11:
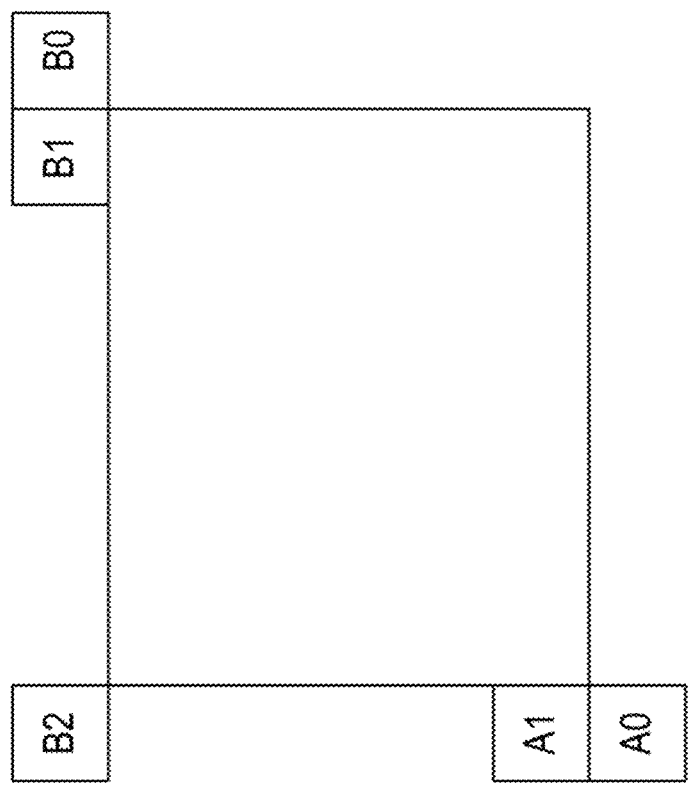
FIG. 11 shows a schematic illustration of exemplary positions of spatial merge candidates in accordance with another embodiment.
Figure 12:
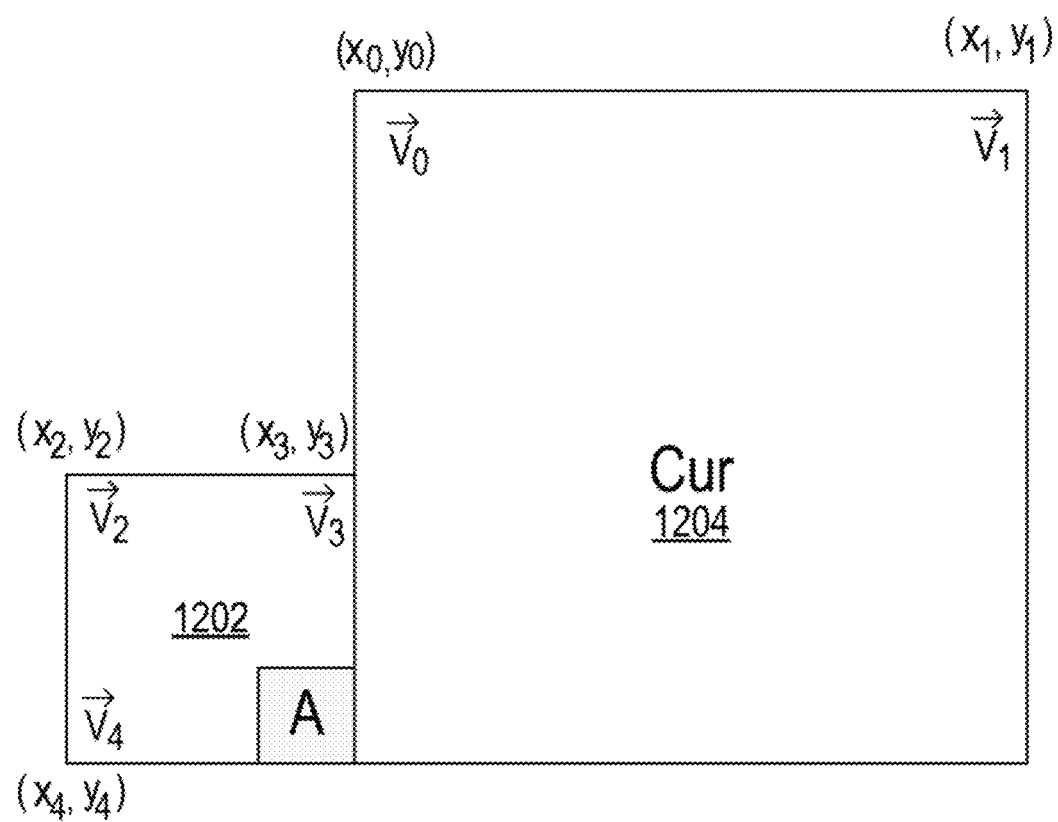
FIG. 12 shows a schematic illustration of control point motion vector inheritance in accordance with another embodiment.

In VTM3, a maximum of two inherited affine candidates can be applied. The two inherited affine candidates can be derived from an affine motion model of neighboring blocks. For example, one inherited affine candidate can be derived from left neighboring CUs and the other inherited affine candidate can be derived from above neighboring CUs. Exemplary candidate blocks can be shown in FIG. 11. As shown in FIG. 11, for a left predictor (or a left inherited affine candidate), a scan order can be A0→A1, and for an above predictor (or an above inherited affine candidate), a scan order can be B0→B1→B2. Thus, only the first available inherited candidate from each side can be selected. No pruning check may be performed between two inherited candidates. When a neighboring affine CU is identified, control point motion vectors of the neighboring affine CU can be used to derive the CPMVP candidate in the affine merge list of the current CU. As shown in FIG. 12, when a neighboring left bottom block A of a current block (1204) is coded in affine mode, motion vectors $v_2$, $v_3$ and $v_4$ of a top left corner, an above right corner, and a left bottom corner of a CU (1202) which contains the block A can be attained. When the block A is coded with 4-parameter affine model, two CPMVs of the current CU (1204) can be calculated according to $v_2$, and $v_3$ of the CU (1202). In a case that block A is coded with a 6-parameter affine model, three CPMVs of the current CU (1204) can be calculated according to $v_2$, $v_3$ and $v_4$ of the CU (1202).

Figure 13:
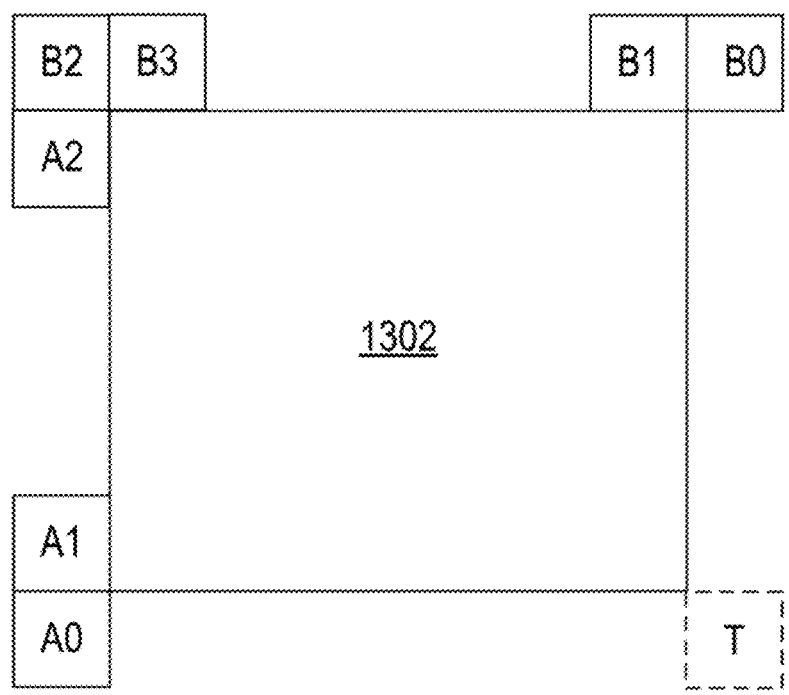
FIG. 13 shows a schematic illustration of locations of candidates for constructing affine merge mode in accordance with another embodiment.

A constructed affine candidate of a current block can be a candidate that is constructed by combining neighbor translational motion information of each control point of the current block. The motion information of the control points can be derived from specified spatial neighbors and a temporal neighbor that can be shown in FIG. 13. As shown in FIG. 13, $CPMV_k$ (k=1, 2, 3, 4) represents a k-th control point of a current block (1302). For $CPMV_1$, B2→B3→A2 blocks can be checked and an MV of the first available block can be used. For $CPMV_2$, B1→B0 blocks can be checked. For $CPMV_3$, A1→A0 blocks can be checked. TMVP can be used as $CPMV_4$ if $CPM_4$ is not available.

After MVs of four control points are attained, affine merge candidates can be constructed for the current block (1302) based on motion information of the four control points. For example, the affine merge candidates can be constructed based on combinations of the MVs of the four control points in an order as follows: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, and {$CPMV_1$, $CPMV_3$}.

The combination of 3 CPMVs can construct a 6-parameter affine merge candidate and the combination of 2 CPMVs can construct a 4-parameter affine merge candidate. To avoid a motion scaling process, if reference indices of control points are different, a related combination of control point MVs can be discarded.

After inherited affine merge candidates and constructed affine merge candidate are checked, if the list is still not full, zero MVs can be inserted to an end of the list.

In affine AMVP prediction, an affine AMVP mode can be applied for CUs with both a width and a height larger than or equal to 16. An affine flag in CU level can be signalled in the bitstream to indicate whether affine AMVP mode is used and then another flag can be signaled to indicate whether a 4-parameter affine or a 6-parameter affine is applied. In affine AMVP prediction, a difference of CPMVs of a current CU and predictors of the CPMVPs of the current CU can be signalled in the bitstream. A size of an affine AMVP candidate list can be 2 and the affine AMVP candidate list can be generated by using four types of CPMV candidate in an order as follows:

(1) Inherited affine AMVP candidates that are extrapolated from the CPMVs of the neighbour CUs,
(2) Constructed affine AMVP candidates with CPMVPs that are derived using the translational MVs of the neighbour CUs,
(3) Translational MVs from neighboring CUs, and (40 Zero MVs.

A checking order of inherited affine AMVP candidates can be the same as a checking order of inherited affine merge candidates. To determine an AVMP candidate, only an affine CU that has the same reference picture as the current block can be considered. No pruning process may be applied when an inherited affine motion predictor is inserted into the candidate list.

A constructed AMVP candidate can be derived from specified spatial neighbors. As shown in FIG. 13, the same checking order can be applied as the checking order in affine merge candidate construction. In addition, a reference picture index of a neighboring block can also be checked. A first block in the checking order can be inter coded and have the same reference picture as the current CU (1302). One constructed AMVP candidate can be determined when the current CU (1302) is coded with a 4-parameter affine mode, and $mv_0$ and $mv_1$ are both available. The constructed AMPV candidate can further be added to the affine AMVP list. When the current CU (1302) is coded with a 6-parameter affine mode, and all three CPMVs are available, the constructed AMVP candidate can be added as one candidate in the affine AMVP list. Otherwise, the constructed AMVP candidate can be set as unavailable.

If candidates in the affine AMVP list are still less than 2 after the inherited affine AMVP candidates and the constructed AMVP candidate are checked, $mv_0$, $mv_1$ and $mv_2$ can be added, in order. The $mv_0$, $mv_1$ and $mv_2$ can function as translational MVs to predict all control point MVs of the current CU (e.g., (1302)) when available. Finally, zero MVs can be used to fill the affine AMVP list if the affine AMVP is still not full.

Subblock-based affine motion compensation can save memory access bandwidth and reduce computation complexity compared to pixel based motion compensation, at the cost of a prediction accuracy penalty. To achieve a finer granularity of motion compensation, prediction refinement with optical flow (PROF) can be used to refine the subblock-based affine motion compensated prediction without increasing the memory access bandwidth for motion compensation. In VVC, after the subblock-based affine motion compensation is performed, a luma prediction sample can be refined by adding a difference derived by an optical flow equation. The PROF can be described in four steps as follows:

Step (1): the subblock-based affine motion compensation can be performed to generate subblock prediction I(i, j).

Step (2): spatial gradients $g_x(i, j)$ and $g_y(i, j)$ of the subblock prediction can be calculated at each sample location using a 3-tap filter [−1, 0, 1]. The gradient calculation can be the same as gradient calculation in BDOF. For example, the spatial gradients $g_x(i, j)$ and $g_y(i, j)$ can be calculated based on equations (5) and (6) respectively.

$$g_x(i, j)=(I(i+1, j) \gg shift1)-(I(i-1, j) \gg shift1) \qquad \text{Eq. (5)}$$

$$g_y(i, j)=(I(i, j+1) \gg shift1)-(I(i, j-1) \gg shift1) \qquad \text{Eq. (6)}$$

As shown in equations (5) and (6), shift1 can be used to control a precision of the gradient. Subblock (e.g., 4×4) prediction can be extended by one sample on each side for the gradient calculation. To avoid additional memory bandwidth and additional interpolation computation, extended samples on extended borders can be copied from a nearest integer pixel position in the reference picture.

Figure 14:
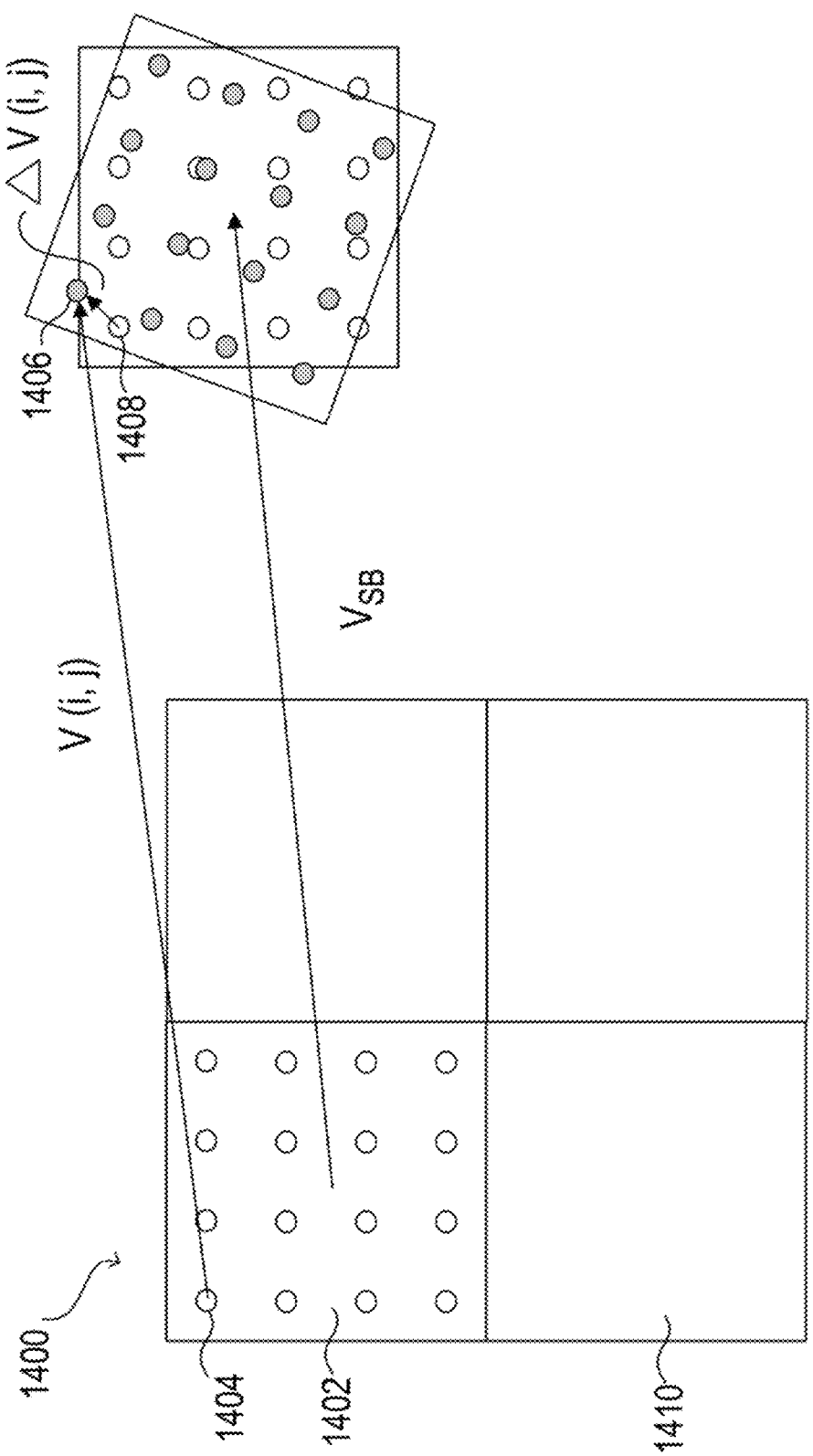
FIG. 14 shows a schematic illustration of a prediction refinement with optical flow (PROF) in accordance with another embodiment.

Step (3): luma prediction refinement can be calculated by an optical flow equation as shown in equation (7).

$$\Delta I(i, j)=g_x(i, j)*\Delta v_x(i, j)+g_y(i, j)*\Delta v_y(i, j) \qquad \text{Eq. (7)}$$

where $\Delta v(i, j)$ can be a difference between a sample MV computed for a sample location (i, j), denoted by v(i, j), and a subblock MV, denoted by $v_{SB}$, of a subblock to which the sample (i, j) belongs. FIG. 14 shows an exemplary illustration of the difference between the sample MV and the subblock MV. As shown in FIG. 14, a subblock (1402) can be included in a current block (1400) and a sample (1404) can be included in the subblock (1402). The sample (1404) can include a sample motion vector v(i, j) that corresponds to a reference pixel (1406). The subblock (1402) can include a subblock motion vector $v_{SB}$. Based on the subblock motion vector $v_{SB}$, the sample (1404) can correspond to a reference pixel (1408). A difference between the sample MV and the subblock MV, denoted by $\Delta v(i, j)$, can be indicated by a difference between the reference pixel (1406) and the reference pixel (1408). The $\Delta v(i, j)$ can be quantized in a unit of 1/32 luma sample precision.

Since affine model parameters and a sample location relative to a subblock center may not be changed from a subblock to another subblock, $\Delta v(i, j)$ can be calculated for a first subblock (e.g., (1402)), and reused for other subblocks (e.g., (1410)) in the same CU (e.g., (1400)). Let dx(i, j) be a horizontal offset and dy(i, j) be a vertical offset from a sample location (i, j) to a center of a subblock ($x_{SB}$, $y_{SB}$), $\Delta v(x, y)$ can be derived by equations (8) and (9) as follows:

$$\begin{cases} dx(i, j) = i - x_{SB} \\ dy(i, j) = j - y_{SB} \end{cases} \qquad \text{Eq. (8)}$$

$$\begin{cases} \Delta v_x(i, j) = C*dx(i, j) + D*dy(i, j) \\ \Delta v_y(i, j) = E*dx(i, j) + F*dy(i, j) \end{cases} \qquad \text{Eq. (9)}$$

In order to keep accuracy, the center of the subblock ($x_{SB}$, $y_{SB}$) can be calculated as (($W_{SB}$−1)/2, ($H_{SB}$−1)/2), where $W_{SB}$ and $H_{SB}$ are the subblock width and height, respectively.

Once $\Delta v(x, y)$ is obtained, parameters of the affine model can be obtained. For example, for a 4-parameter affine model, the parameters of the affine model can be shown in equation (10).

$$\begin{cases} C = F = \dfrac{v_{1x} - v_{0x}}{w} \\ E = -D = \dfrac{v_{1y} - v_{0y}}{w} \end{cases} \qquad \text{Eq. (10)}$$

For a 6-parameter affine model, the parameters of the affine model can be shown in equation (11).

$$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \qquad \text{Eq. (11)}$$

where ($v_{0x}$, $v_{0y}$), ($v_{1x}$, $v_{1y}$), ($v_{2x}$, $v_{2y}$) can be a top-left control point motion vector, a top-right control point motion vector, and a bottom-left control point motion vector respectively, and w and h can be a width and a height of the CU respectively.

Step (4): finally, the luma prediction refinement $\Delta I(i, j)$ can be added to the subblock prediction I(i, j). A final prediction I' can be generated as shown in equation (12).

$$I'(i, j)=I(i, j)+\Delta I(i, j) \qquad \text{Eq. (12)}$$

PROF may not be applied in two cases for an affine coded CU: (1) all control point MVs are the same, which indicates that the CU only has translational motion, and (2) the affine motion parameters are greater than a specified limit because the subblock-based affine MC is degraded to CU-based MC to avoid a large memory access bandwidth requirement.

Affine Motion Estimation (ME), such as in VVC reference software VTM, can be operated for both Uni-prediction and Bi-prediction. The Uni-prediction can be performed on one of a reference list L0 and a reference list L1 and the Bi-prediction can be performed on both the reference list L0 and the reference list L1.

Figure 15:
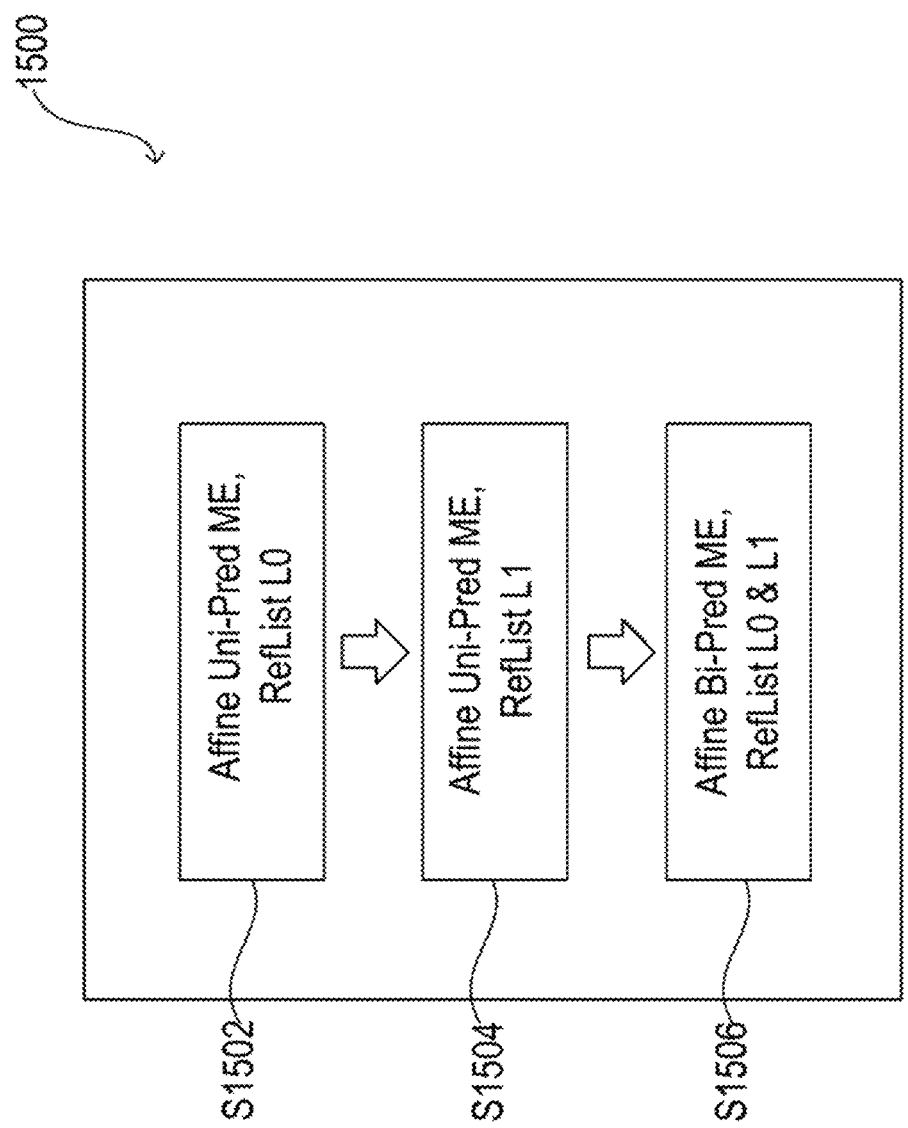
FIG. 15 shows a schematic illustration of an affine motion estimation process with another embodiment.

FIG. 15 shows a schematic illustration of affine ME (1500). As shown in FIG. 15, in affine ME (1500), an affine Uni-prediction (S1502) can be performed on the reference list L0 to obtain a prediction P0 of a current block based on an initial reference block in the reference list L0. An affine Uni-prediction (S1504) can also be performed on the reference list L1 to obtain a prediction P1 of the current block based on an initial reference block in the reference list L1. At (S1506), an affine Bi-prediction can be performed. The affine Bi-prediction (S1506) can start with an initial prediction residue (2I-P0)-P1, where I can be initial values of the current block. The affine Bi-prediction (S1506) can search candidates in the reference list L1 around the initial reference block in the reference list L1 to find a best (or selected) reference block that has a minimum prediction residue (2I-P0)-Px, where Px is prediction of the current block based on the selected reference block.

With a reference picture, for a current coding block, the Affine ME process can first pick a set of control point motion vectors (CPMVs) as a base. An iterative method can be used to generate a prediction output of a current affine model that corresponds to the set of CPMVs, calculate gradients of prediction samples, and then solve a linear equation to determine delta CPMVs to optimize affine prediction. The iterations can stop when all the delta CPMVs are 0, or a maximum number of iterations is reached. The CPMVs obtained from the iterations can be final CPMVs for the reference picture.

After the best affine CPVMs on both the reference list L0 and L1 are determined for affine Uni-prediction, affine Bi-prediction searching can be performed using the best Uni-prediction CPMVs and a reference list on one side, and searching for best CPMVs on the other reference list to optimize affine Bi-prediction output. The affine Bi-prediction search can be performed iteratively on the two reference lists to obtain optimal results.

Figure 16:
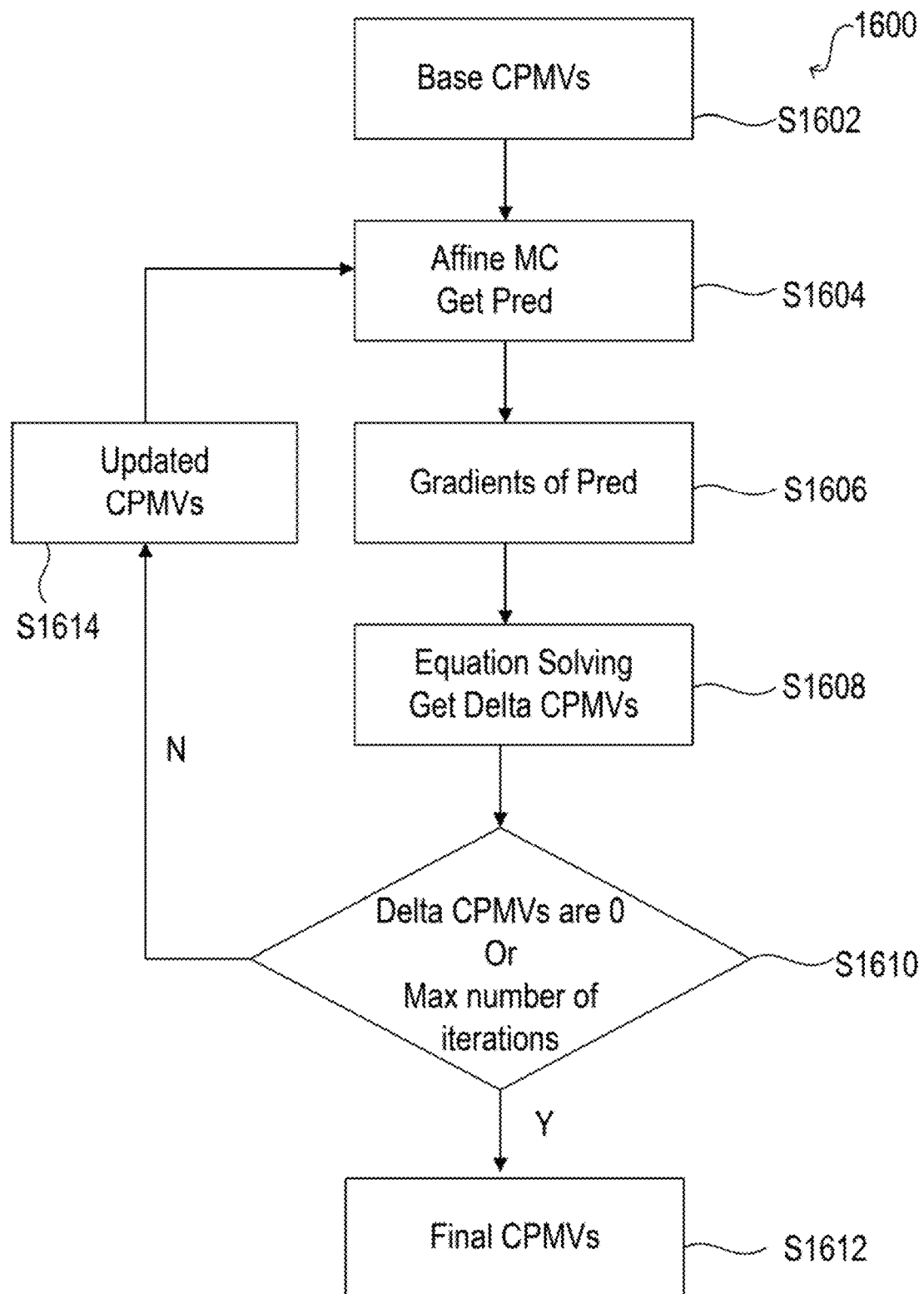
FIG. 16 shows a flow chart of affine motion estimation search in accordance with another embodiment.

FIG. 16 shows an exemplary affine ME process (1600) in which final CPMVs associated with a reference picture can be calculated. The affine ME process (1600) can start with (S1602). At (S1602), base CPMVs of a current block can be determined. The base CPMVs can be determined based on one of a merge index, an advanced motion vector prediction (AMVP) predictor index, an affine merge index, or the like.

At (S1604), an initial affine prediction of the current block can be obtained based on the base CPMVs. For example, according to the base CPMVs, a 4-parameter affine motion model of a 6-parameter affine motion model can be applied to generate the initial affine prediction.

At (S1606), gradients of the initial affine prediction can be obtained. For example, the gradients of the initial affine prediction can be obtained based on equations (5) and (6).

At (S1608), delta CPMVs can be determined. In some embodiments, the delta CPMVs can be associated with a displacement between the initial affine prediction and a subsequent affine prediction, such as a first affine prediction. Based on the gradients of the initial affine prediction and the delta CPMVs, first affine prediction can be obtained. The first affine prediction can correspond to first CPMVs.

At (S1610), a determination can be made to check whether the delta CPMVs are zero or an iteration number is equal to or larger than a threshold value. When the delta CPMVs are zero or the iteration number is equal to or larger than the threshold value, final (or selected) CPMVs can be determined at (S1612). The final (or selected) CPMVs can be the first CPMVs that are determined based on the gradients of the initial affine prediction and the delta CPMVs.

Still referring to (S1610), when the delta CPMVs are not zero or the iteration number is less than the threshold value, a new iteration can start. In the new iteration, updated CPMVs (e.g., the first CPMVs) can be provided to (S1604) to generate an updated affine prediction. The affine ME process (1600) can then proceed to (S1606), where gradients of the updated affine prediction can be calculated. The affine ME process (1600) can then proceed to (S1608) to continue the new iteration.

In an affine motion model, a 4-parameter affine motion model can further be described by formulas that include motions of rotation and zooming. For example, a 4-parameter affine motion model can be rewritten in equations (13) as follows:

$$\begin{cases} mv_x = ax + by + c = (r \cdot \cos\theta - 1) \cdot x + r \cdot \sin\theta \cdot y + c \\ mv_y = -bx + ay + f = -r \cdot \sin\theta \cdot x + (r \cdot \cos\theta - 1) \cdot y + f \end{cases} \quad \text{Eq. (13)}$$

where r and θ can be a zooming factor and a rotation angle, respectively. When a current frame is temporally in a middle of two reference frames, and if the motion is constant and continuous, the zooming factor can be exponential while the rotation angle can be constant. Therefore, equation (13) can be applied to formulate an affine motion to one reference, such as an affine motion to a reference list 0. An affine motion to another reference frame that is temporally on another side of the current frame, such as a reference list 1, can be described in equation (14).

$$\begin{cases} mv_x = \left(\frac{1}{r} \cdot \cos(-\theta) - 1\right) \cdot x + \frac{1}{r} \cdot \sin(-\theta) \cdot y - c \\ mv_y = -\frac{1}{r} \cdot \sin(-\theta) \cdot x + \left(\frac{1}{r} \cdot \cos(-\theta) - 1\right) \cdot y - f \end{cases} \quad \text{Eq. (14)}$$

Equations (13) and (14) can be called a symmetric affine motion model. The symmetric affine motion model can be applied to further improve coding efficiency. It should be noted that relationships between a, b, r, and θ can be described in equation (15) as follows:

$$\begin{cases} r^2 = (a+1)^2 + b^2 \\ \tan\theta = \dfrac{b}{a+1} \end{cases} \quad \text{Eq. (15)}$$

Bi-directional optical flow (BDOF) in VVC, was previously referred to as BIO in the JEM. Compared to the JEM version, the BDOF in VVC can be a simpler version that requires less computation, especially in terms of the number of multiplications and the size of the multiplier.

BDOF can be used to refine a bi-prediction signal of a CU at a 4×4 subblock level. BDOF can be applied to a CU if the CU satisfies conditions as follows:
  (1) The CU is coded using "true" bi-prediction mode, i.e., one of the two reference pictures is prior to the current picture in display order and the other is after the current picture in display order,
  (2) The distances (e.g., POC difference) from two reference pictures to the current picture are the same, (3) Both reference pictures are short-term reference pictures,
(4) The CU is not coded using affine mode or the SbTMVP merge mode,
(5) CU has more than 64 luma samples,
(6) Both CU height and CU width are larger than or equal to 8 luma samples,
(7) BCW weight index indicates equal weight,
(8) Weighted position (WP) is not enabled for the current CU, and
(9) CIIP mode is not used for the current CU.

BDOF may be only applied to a luma component. As the name of BDOF indicates, the BDOF mode can be based on an optical flow concept, which assumes that a motion of an object is smooth. For each 4×4 subblock, a motion refinement $(v_x, v_y)$ can be calculated by minimizing a difference between L0 and L1 prediction samples. The motion refinement can then be used to adjust the bi-predicted sample values in the 4×4 subblock. BDOF can include steps as follows:

First, horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals from the reference list L0 and the reference list L1 can be computed by directly calculating a difference between two neighboring samples. The horizontal and vertical gradients can be provided in equations (16) and (17) as follows:

$$\frac{\partial I^{(k)}}{\partial x}(i, j) = \left( \left( I^{(k)}(i+1, j) \gg \text{shift1} \right) - \left( I^{(k)}(i-1, j) \gg \text{shift1} \right) \right) \quad \text{Eq. (16)}$$

$$\frac{\partial I^{(k)}}{\partial y}(i, j) = \left( \left( I^{(k)}(i, j+1) \gg \text{shift1} \right) - \left( I^{(k)}(i, j-1) \gg \text{shift1} \right) \right) \quad \text{Eq. (17)}$$

where $I^{(k)}(i, j)$ can be a sample value at coordinate (i, j) of the prediction signal in list k, k=0, 1, and shift1 can be calculated based on a luma bit depth, bitDepth, as shift1=max(6, bitDepth-6).

Then, an auto- and cross-correlation of the gradients, $S_1$, $S_2$, $S_3$, $S_5$ and $S_6$, can be calculated according to equations (18)-(22) as follows:

$$S_1 = \Sigma_{(i, j) \in \Omega} \text{Abs}(\psi_x(i, j)), \quad \text{Eq. (18)}$$

$$S_3 = \Sigma_{(i, j) \in \Omega} \psi_x(i, j) \cdot \text{sign}(\psi_y(i, j)) \quad \text{Eq. (19)}$$

$$S_3 = \Sigma_{(i, j) \in \Omega} \theta(i, j) \cdot \text{Sign}(\psi_x(i, j)) \quad \text{Eq. (20)}$$

$$S_5 = \Sigma_{(i, j) \in \Omega} \text{Abs}(\psi_y(i, j)) \quad \text{Eq. (21)}$$

$$S_6 = \Sigma_{(i, j) \in \Omega} \theta(i, j) \cdot \text{Sign}(\psi_y(i, j)) \quad \text{Eq. (22)}$$

where $\psi_x(i, j)$, $\psi_y(i, j)$, and $\theta(i, j)$ can be provided in equations (23)-(25) respectively.

$$\psi_x(i, j) = \left( \frac{\partial I^{(1)}}{\partial x}(i, j) + \frac{\partial I^{(0)}}{\partial x}(i, j) \right) \gg n_a \quad \text{Eq. (23)}$$

$$\psi_y(i, j) = \left( \frac{\partial I^{(1)}}{\partial y}(i, j) + \frac{\partial I^{(0)}}{\partial y}(i, j) \right) \gg n_a \quad \text{Eq. (24)}$$

$$\theta(i, j) = \left( I^{(1)}(i, j) \gg n_b \right) - \left( I^{(0)}(i, j) \gg n_b \right) \quad \text{Eq. (25)}$$

where $\Omega$ can be a 6×6 window around the 4×4 subblock, and the values of $n_a$ and $n_b$ can be set equal to min (1, bitDepth−11) and min (4, bitDepth−8), respectively.

The motion refinement $(v_x, v_y)$ can then be derived using the cross- and auto-correlation terms using equations (26) and (27) as follows:

$$v_x = S_1 > 0 ? \text{clip3}(-th'_{BIO}, th'_{BIO}, -((S_3 \cdot 2^{nb-n_a}) \gg \lfloor \log_2 S_1 \rfloor)) : 0 \quad \text{Eq. (26)}$$

$$v_y = S_5 > 0 ? \text{clip3}(-th'_{BIO}, th'_{BIO}, -((S_6 \cdot 2^{nb-n} \text{ is } a - ((v_x S_{2,m}) \ll n_{S_2} + v_x S_{2,s})/2) \gg \lfloor \log_2 S_5 \rfloor)) : 0 \quad \text{Eq. (27)}$$

where $$S_{2,m} = S_2 \gg n_{S_2}, S_{2,s} = S_2 \& (2^{n_{S_2}} - 1), th'_{BIO} = 2^{\max(5, BD-7)}.$$

$\lfloor \cdot \rfloor$ is a floor function, and $n_{S_2} = 12$. Based on the motion refinement and the gradients, an adjustment can be calculated for each sample in the 4×4 subblock based on equation (28):

$$b(x, y) = \text{rnd}\left( \left( v_x \left( \frac{\partial I^{(1)}(x, y)}{\partial x} - \frac{\partial I^{(0)}(x, y)}{\partial x} \right) + v_y \left( \frac{\partial I^{(1)}(x, y)}{\partial y} - \frac{\partial I^{(0)}(x, y)}{\partial y} \right) + 1 \right) / 2 \right) \quad \text{Eq. (28)}$$

Finally, the BDOF samples of the CU can be calculated by adjusting the bi-prediction samples in equation (29) as follows:

$$\text{pred}_{BDOF}(x, y) = (I^{(0)}(x, y) + I^{(1)}(x, y) + b(x, y) + o_{offset}) \gg \text{shift} \quad \text{Eq. (29)}$$

Values can be selected such that multipliers in the BDOF process do not exceed 15-bits, and a maximum bit-width of the intermediate parameters in the BDOF process can be kept within 32-bits.

Figure 17:
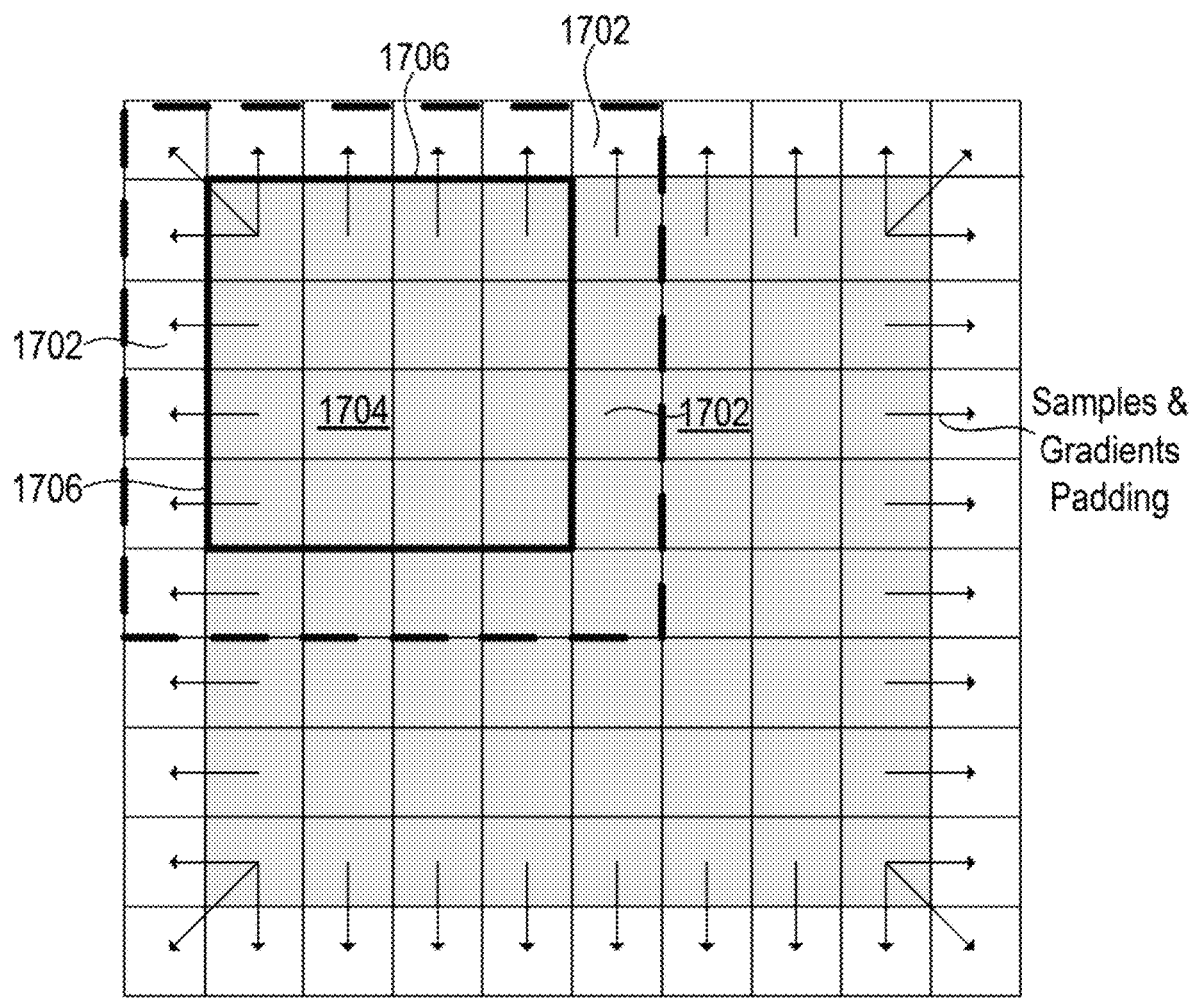
FIG. 17 shows a schematic illustration of an extended coding unit (CU) region for bi-directional optical flow (BDOF) in accordance with another embodiment.

In order to derive the gradient values, some prediction samples $I^{(k)}(i, j)$ in the list k (k=0, 1) outside of the current CU boundaries need to be generated. As shown in FIG. 17, BDOF in VVC can use one extended row/column (1702) around boundaries (1706) of a CU (1704). In order to control the computational complexity of generating the out-of-boundary prediction samples, prediction samples in an extended area (e.g., unshaded region in FIG. 17) can be generated by taking the reference samples at the nearby integer positions (e.g., using a floor( ) operation on the coordinates) directly without interpolation, and a normal 8-tap motion compensation interpolation filter can be used to generate prediction samples within the CU (e.g., the shaded region in FIG. 17). The extended sample values can be used in gradient calculation only. For the remaining steps in the BDOF process, if any samples and gradient values outside of the CU boundaries are needed, the samples and gradient values can be padded (e.g., repeated) from nearest neighbors of the samples and gradient values.

When a width and/or a height of a CU is larger than 16 luma samples, the CU can be split into subblocks with a width and/or a height equal to 16 luma samples, and the subblock boundaries can be treated as CU boundaries in the BDOF process. A maximum unit size for BDOF process can be limited to 16×16. For each subblock, the BDOF process can be skipped. When a sum of absolute difference (SAD) between the initial L0 and L1 prediction samples is smaller than a threshold, the BDOF process may not be applied to the subblock. The threshold can be set equal to (8*W*(H»1), where W can indicate the width of the subblock, and H can indicate the height of the subblock. To avoid the additional complexity of a SAD calculation, the SAD between the initial L0 and L1 prediction samples calculated in DMVR process can be re-used in the BBOF process.

If BCW is enabled for a current block, i.e., the BCW weight index indicates unequal weight, then bi-directional optical flow can be disabled. Similarly, if WP is enabled for the current block, i.e., a luma weight flag (e.g., luma_weight_lx_flag) is 1 for either of the two reference pictures, then BDOF may also be also disabled. When a CU is coded with symmetric MVD mode or CIIP mode, BDOF may also be disabled.

In order to increase the accuracy of the MVs of the merge mode, a bilateral-matching (BM)-based decoder side motion vector refinement can be applied, such as in VVC. In a bi-prediction operation, a refined MV can be searched around initial MVs in a reference picture list L0 and a reference picture list L1. The BM method can calculate a distortion between two candidate blocks in the reference picture list L0 and list L1.

Figure 18:
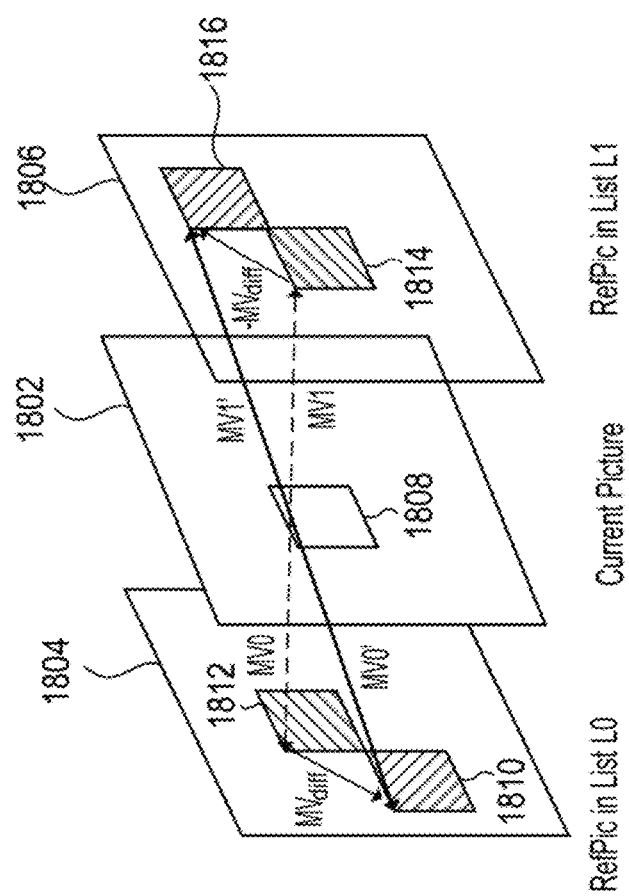
FIG. 18 shows a schematic illustration of decoding side motion vector refinement in accordance with another embodiment.

FIG. 18 shows an exemplary schematic view of a BM-based decoder side motion vector refinement. As show in FIG. 18, a current picture (1802) can include a current block (1808). The current picture can include a reference picture list L0 (1804) and a reference picture list L1 (1806). The current block (1808) can include an initial reference block (1812) in the reference picture list L0 (1804) according to an initial motion vector MV0 and an initial reference block (1814) in the reference picture list L1 (1806) according to an initial motion vector MV1. A searching process can be performed around the initial MV0 in the reference picture list L0 (1804) and the initial MV1 in the reference picture list L1 (1806). For example, a first candidate reference block (1810) can be identified in the reference picture list L0 (1804) and a first candidate reference block (1816) can be identified in the reference picture list L1 (1806). A SAD between candidate reference blocks (e.g., (1810) and (1816)) based on each MV candidate (e.g., MV0' and MV1') around the initial MV (e.g., MV0 and MV1) can be calculated. A MV candidate with the lowest SAD can become the refined MV and used to generate a bi-predicted signal to predict the current block (1808).

The application of DMVR can be restricted and may only be applied for CUs which are coded based on modes and features, such as in VVC, as follows:

(1) CU level merge mode with bi-prediction MV,
(2) One reference picture is in the past and another reference picture is in the future with respect to the current picture,
(3) The distances (e.g., POC difference) from two reference pictures to the current picture are the same,
(4) Both reference pictures are short-term reference pictures,
(5) CU has more than 64 luma samples,
(6) Both CU height and CU width are larger than or equal to 8 luma samples,
(7) BCW weight index indicates equal weight,
(8) WP is not enabled for the current block, and
(9) CIIP mode is not used for the current block.

The refined MV derived by the DMVR process can be used to generate inter prediction samples and be used in temporal motion vector prediction for future pictures coding. While the original MV can be used in the deblocking process and be used in spatial motion vector prediction for future CU coding.

In DVMR, search points can surround the initial MV and the MV offset can obey a MV difference mirroring rule. In other words, any points that are checked by DMVR, denoted by a candidate MV pair (MV0, MV1), can obey the MV difference mirroring rule that is shown in equations (30) and (31):

$$MV0'=MV0+MV\_offset \quad \text{Eq. (30)}$$

$$MV1'=MV1-MV\_offset \quad \text{Eq. (31)}$$

Where MV_offset can represent a refinement offset between the initial MV and the refined MV in one of the reference pictures. The refinement search range can be two integer luma samples from the initial MV. The searching can include an integer sample offset search stage and a fractional sample refinement stage.

For example, a 25 points full search can be applied for integer sample offset searching. The SAD of the initial MV pair can first be calculated. If the SAD of the initial MV pair is smaller than a threshold, the integer sample stage of DMVR can be terminated. Otherwise SADs of the remaining 24 points can be calculated and checked in a scanning order, such as a raster scanning order. The point with the smallest SAD can be selected as an output of integer sample offset searching stage. To reduce the penalty of the uncertainty of DMVR refinement, the original MV during the DMVR process can have a priority to be selected. The SAD between the reference blocks referred by the initial MV candidates can be decreased by ¼ of the SAD value.

The integer sample search can be followed by fractional sample refinement. To save the calculational complexity, the fractional sample refinement can be derived by using a parametric error surface equation, instead of an additional search with SAD comparison. The fractional sample refinement can be conditionally invoked based on the output of the integer sample search stage. When the integer sample search stage is terminated with a center having the smallest SAD in either the first iteration search or the second iteration search, the fractional sample refinement can further be applied.

In a parametric error surface-based sub-pixel offsets estimation, the center position cost and the costs at four neighboring positions from the center can be used to fit a 2-D parabolic error surface equation based on equation (32):

$$E(x, y)=A(x-x_{min})^2+B(y-y_{min})^2+C \quad \text{Eq. (32)}$$

where $(x_{min}, y_{min})$ can correspond to a fractional position with the least cost and C can correspond to a minimum cost value. By solving the equation (32) using the cost value of the five search points, the $(x_{min}, y_{min})$ can be computed in equations (33) and (34):

$$x_{min}=(E(-1, 0)-E(1, 0))/(2(E(-1, 0)+E(1, 0)-2E(0, 0))) \quad \text{Eq. (33)}$$

$$y_{min}=(E(0, -1)-E(0, 1))/(2(E(0, -1)+E(0, 1)-2E(0, 0))) \quad \text{Eq. (34)}$$

The value of $x_{min}$ and $y_{min}$ can be automatically constrained to be between −8 and 8 since all cost values are positive and the smallest value is E(0,0). The constraints of the value of $x_{min}$ and $y_{min}$ can correspond to a half pel (or pixel) offset with 1/16th-pel MV accuracy in VVC. The computed fractional $(x_{min}, y_{min})$ can be added to the integer distance refinement MV to get the sub-pixel accurate refinement delta MV.

Bilinear-interpolation and sample padding can be applied, such as in VVC. A resolution of MVs can be 1/16 luma samples, for example. Samples at a fractional position can be interpolated using an 8-tap interpolation filter. In DMVR, search points can surround an initial fractional-pel MV with an integer sample offset, therefore the samples of the fractional position need to be interpolated for DMVR search process. To reduce the calculation complexity, a bi-linear interpolation filter can be used to generate the fractional samples for the searching process in DMVR. In another important effect, by using the bi-linear filter with a 2-sample search range, the DVMR does not access more reference samples compared to a normal motion compensation process. After the refined MV is attained with a DMVR search process, the normal 8-tap interpolation filter can be applied to generate a final prediction. In order not to access more reference samples compared to a normal MC process, the samples, which may not be needed for the interpolation process based on the original MV but may be needed for the interpolation process based on the refined MV, can be padded from samples that are available.

When a width and/or a height of a CU is larger than 16 luma samples, the CU can be further split into subblocks with a width and/or a height equal to 16 luma samples. A maximum unit size for DMVR searching process can be limit to 16×16.

In related bilateral matching processes, such as BDOF and DMVR, only a translation motion model is applied, which may not capture complicated motion information.

In the disclosure, bilateral matching can be provided to derive/refine affine motion parameters instead of signaling. The affine parameters can include translational motion, rotation, zooming, and/or other motion. The bilateral matching can be performed to find a best (or selected) match between two blocks (e.g., a first reference block and a second reference block) in reference frames (e.g., a first reference frame and a second reference frame) in terms of minimal matching error, such as SAD, SSE, or the like. The two blocks in the reference frames can be constrained by an affine motion model.

In some embodiments, the affine motion model can be a 4-parameter affine motion model or a 6-parameter affine motion model. In some embodiments, the constraints applied to the two blocks in the reference frames can be associated with parameters of the affine motion model. The parameters can include a zooming factor, a rotation angle, a translation part, or the like.

Let affine motion 0 (or affMv0) and affine motion 1 (or affMv1) be affine motions from a current block to the first reference and second reference blocks respectively, the two blocks (or reference blocks) can be located (or determined) by affMv0 and affMv1 under the constraints of the disclosure. In an embodiment, affMV0 or the affMV1 can be described by a 4-parameter affine motion model shown in equation (1). In another embodiment, affMV0 or the affMV1 can be described by a 6-parameter affine motion model shown in equation (3). In another embodiment, affMv0 and affMv1 can represent delta affine motions relative to an initial motion of the two reference blocks, such as indicated by a merge index or a predictor index. In an example, temporal distance 0 (or dPoc0) and temporal distance 1 (or dPoc1) are temporal distances between a current frame and the two reference frames, respectively.

When Poc_Cur denotes a picture order count (POC) of the current frame, RefPoc_L0 denotes a POC of the reference frame on list L0 (or a first reference frame), and RefPoc_L1 denotes a POC of the reference frame on list L1 (or the second reference frame), dPoc0 and dPoc1 can be described in equations (35) and (36) as follows:

$$dPoc0 = Poc\_Cur - RefPoc\_L0 \qquad \text{Eq. (35)}$$

$$dPoc1 = Poc\_Cur - RefPoc\_L1 \qquad \text{Eq. (36)}$$

dPoc0 and dPoc1 can have different signs (e.g., a positive sign and a negative sign). The different signs can indicate that the two reference frames are temporally on different sides of the current frame.

In the disclosure, temporal-distance-based constraints can be applied to the affine motions (e.g., affMV0 ad affMV1). In an embodiment, translational parts of affMv0 and affMv1 can be associated with dPoc0/dPoc1. For example, the translational parts of affMv0 and affMv1 can be in proportion to dPoc0/dPoc1. The translational parts can be presented by c in a first direction (e.g., X direction) and f in a second direction (e.g., Y direction), which are shown in equation (13).

In an embodiment, zooming factor parts of affMv0 and affMv1 can be associated with dPoc0/dPoc1. The zooming factor parts of affMv0 and affMv1 can be in proportion, such as exponentially in proportion, to dPoc0/dPoc1. The zooming factor can be r shown in equation (13). For example, if a zooming factor of affMv0 is r0 for the first reference block. A zooming factor r1 of affMv1 can be shown in equations (37):

$$r_1 = r_0^{\frac{dPoc_1}{dPoc_0}} \qquad \text{Eq. (37)}$$

In an embodiment, $\alpha_0$ and $\alpha_1$ can be delta zooming parts of affMv0 and affMv1 relative to 1, respectively. $\alpha_0 = r_0 - 1$, and $\alpha_1 = r_1 - 1$. A constraint can be applied to $\alpha_0$ and $\alpha_1$ such that $\alpha_0$ and $\alpha_1$ can be proportional to dPoc0/dPoc1, such as linearly proportional to dPoc0/dPoc1 in equation (38):

$$\frac{\alpha_0}{\alpha_1} = \frac{dPoc_0}{dPoc_1} \qquad \text{Eq. (38)}$$

In an embodiment, rotation angles $\theta_0$ and $\theta_1$ of affMv0 and affMv1 (such as in equation (13)) can be associated with dPoc0/dPoc1, such as proportional to dPoc0/dPoc1. For example, the rotation angles $\theta_0$ and $\theta_1$ of affMv0 and affMv1 can be linearly proportional to dPoc0/dPoc1 as shown in equation (39):

$$\frac{\theta_0}{\theta_1} = \frac{dPoc_0}{dPoc_1} \qquad \text{Eq. (39)}$$

In an embodiment, when different weighting factors are applied for the two reference lists (e.g., the reference list L0 and the reference list L1) of an affine bi-prediction (e.g., BCW or picture level weighted Bi-prediction), additional weighting factors can be applied for the temporal-distance-based constraints. In one example, let w denote a weighting factor derived from the bi-prediction weights, the linear ratio dPoc1/dPoc0 used in above equations (37)-(39) can be replaced by:

$$w \cdot \frac{dPoc_1}{dPoc_0}$$

In the disclosure, a bilateral matching process can be applied to predict a current block in a current frame.

In an embodiment, the bilateral matching process can be performed by searching for a minimal matching error within a certain search range. In an example, the search can be performed in a similar way as DMVR. Different from DMVR, the searching range can include not only the translational parts, but also the rotation and zooming factors. The search range may be signaled in bitstreams, or predefined. Further, different search ranges may be used for different cases, such as based on temporal distance between the current frame and reference frames, frame type, and/or temporal level.

According to the bilateral matching process, a plurality of candidate reference block pairs can be determined based on the search range according to one or more constraints of the affine motion model that are provided in at least one of the equations (37)-(39). Each candidate reference block pair of the plurality of candidate reference block pairs can include a respective candidate reference block in the first reference frame and a respective candidate reference block in the second reference frame. A respective cost value can be determined for each candidate reference block pair of the plurality of candidate reference block pairs. The cost value can indicate a difference between the candidate reference block in the first reference frame and the candidate reference block in the second reference frame. The cost value can be determined based on one of mean square error (MSE), mean absolute difference (MAD), SAD, sum of absolute transformed difference (SATD), or the like. A reference block pair in the plurality of candidate reference block pairs that is associated with a minimum cost value can be selected to predict the current block. For example, based on CPMVs associated with the selected reference block pair, an affine motion model can be determined. A block-level, a subblock-level, or a pixel-level prediction of the current block can further be performed based on the determined affine motion model.

In an embodiment, the bilateral matching process can be operated by minimizing a distortion model of the two reference blocks of a current block. The distortion model can be based on a first order Taylor expansion, which can be similar to that of BDOF in equation (7) or affine ME in VTM software provided in FIGS. 15-16.

A distortion model (or distortion value) between the two reference blocks in a first iteration of the bilateral matching process can be provided in equations (40)-(42) as follows:

$$D_1(i,j) = P_{1,L0}(i,j) - P_{1,L1}(i,j) \quad \text{Eq. (40)}$$

$$P_{1,L0}(i,j) = P_{0,L0}(i,j) + g_{x0,L0}(i,j) * \Delta v_{x0,L0}(i,j) + g_{y0,L0}(i,j) * \Delta v_{y0,L0}(i,j) \quad \text{Eq. (41)}$$

$$P_{1,L1}(i,j) = P_{0,L1}(i,j) + g_{x0,L1}(i,j) * \Delta v_{x0,L1}(i,j) + g_{y0,L1}(i,j) * \Delta v_{y0,L1}(i,j) \quad \text{Eq. (42)}$$

As shown in equation (40), $P_{1,L0}(i,j)$ can be a first predictor of a current block based on a first reference block in the reference list L0. $P_{1,L1}(i,j)$ can be a first predictor of the current block based on a first reference block in the reference list L1. (i, j) can be a location of a pixel (or sample). $D_1(i,j)$ indicates a pixel difference between the $P_{1,L0}(i,j)$ and $P_{1,L1}(i,j)$. The first reference block in the reference list L0 can be determined by an affine motion 0 (e.g., affMV0) from the current block to the first reference block in the reference list L0. The first reference block in the reference list L1 can be determined by affine motion 1 (e.g., affMV1) from the current block to the first reference block in the reference list L1. The affine motion 0 and the affine motion 1 can be constrained by at least one of the equations (37)-(39).

$P_{1,L0}(i,j)$ and $P_{1,L1}(i,j)$ can be determined according to the affine ME search process shown in FIG. 16. As shown in equation (41), $P_{0,L0}(i,j)$ can be an initial predictor of the current block based on an initial reference block (or base CPMVs) in the reference list L0. $g_{x0,L0}(i,j)$ can be a gradient of the initial predictor $P_{0,L0}(i,j)$ in the x direction. $g_{y0,L0}(i,j)$ can be a gradient of the initial predictor $P_{0,L0}(i,j)$ in the y direction. $\Delta v_{x0,L0}(i,j)$ can be a difference or a displacement of two reference blocks (or subblocks), such as the initial reference block and the first reference block in reference list L0 along the x direction. $\Delta v_{y0,L0}(i,j)$ can be a difference or a displacement of two reference blocks (or subblocks), such as the initial reference block and the first reference block in reference list L0 along the y direction.

Similarly, as shown in equation (42), $P_{0,L1}(i,j)$ can be an initial predictor of the current block based on an initial reference block (or base CPMVs) in the reference list L1. $g_{x0,L1}(i,j)$ can be a gradient of the initial predictor $P_{0,L1}(i,j)$ in the x direction. $g_{y0,L1}(i,j)$ can be a gradient of the initial predictor $P_{0,L1}(i,j)$ in the y direction. $\Delta v_{x0,L1}(i,j)$ can be a difference or a displacement of two reference blocks (or subblocks), such as the initial reference block and the first reference block in reference list L1 along the x direction. $\Delta v_{y0,L1}(i,j)$ can be a difference or a displacement of two reference blocks (or subblocks), such as the initial reference block and the first reference block in reference list L1 along the y direction.

In response to at least one of the $\Delta v_{x0,L0}(i,j)$, $\Delta v_{y0,L0}(i,j)$, $\Delta v_{x0,L1}(i,j)$, and $\Delta v_{y0,L1}(i,j)$ not being zero, the bilateral matching can then proceed to a second iteration. In the second iteration, a second predictor $P_{2,L0}(i,j)$ of the current block based on a second reference block in the reference list L0, and a second predictor $P_{2,L1}(i,j)$ of the current block based on a second reference block in the reference list L1 can be determined according to equations (43)-(44) as follows:

$$P_{2,L0}(i,j) = P_{1,L0}(i,j) + g_{x1,L0}(i,j) * \Delta v_{x1,L0}(i,j) + g_{y1,L0}(i,j) * \Delta v_{y1,L0}(i,j) \quad \text{Eq. (43)}$$

$$P_{2,L1}(i,j) = P_{1,L1}(i,j) + g_{x1,L1}(i,j) * \Delta v_{x1,L1}(i,j) + g_{y1,L1}(i,j) * \Delta v_{y1,L1}(i,j) \quad \text{Eq. (44)}$$

As shown in equation (43), $g_{x1,L0}(i,j)$ can be a gradient of the first predictor $P_{1,L0}(i,j)$ in the x direction. $g_{y1,L0}(i,j)$ can be a gradient of the first predictor $P_{1,L0}(i,j)$ in the y direction. $\Delta v_{x1,L0}(i,j)$ can be a difference or a displacement of the first reference block and the second reference block in reference list L0 along the x direction. $\Delta v_{y1,L0}(i,j)$ can be a difference or a displacement between the first reference block and the second reference block along the y direction. As shown in equation (44), $g_{x1,L1}(i,j)$ can be a gradient of the first predictor $P_{1,L1}(i,j)$ in the x direction. $g_{y1,L1}(i,j)$ can be a gradient of the first predictor $P_{1,L1}(i,j)$ in the y direction. $\Delta v_{x1,L1}(i,j)$ can be a difference or a displacement of the first reference block and the second reference block in reference list L1 along the x direction. $\Delta v_{y1,L1}(i,j)$ can be a difference or a displacement between the first reference block and the second reference block in reference list L1 along the y direction.

The second reference block in the reference list L0 can be indicated by an affine motion 0' (e.g., affMV0') from the current block to the second reference block in the reference list L0. The second reference block in the reference list L1 can be indicated by affine motion 1' (e.g., affMV1') from the current block to the second reference block in the reference list L1. The affine motion 0' and the affine motion 1' can be constrained by at least one of the equations (37)-(39).

Further, a pixel difference (or a cost value) between the $P_{2,\ L0}(i, j)$ and $P_{2,\ L1}(i, j)$ can be calculated according to equation (45) as follows:

$$D_2(i, j) = P_{2,\ L0}(i, j) - P_{2,\ L1}(i, j) \qquad \text{Eq. (45)}$$

The iteration of the bilateral matching process can be terminated when an iteration number N is equal to or larger than a threshold value, or a displacement $\Delta v_{N+1,\ L0}(i, j)$ between a N-th reference block in the reference list L0 and an (N+1)-th reference block in the reference list L0 is zero, or a displacement $\Delta v_{N+1,\ L1}(i, j)$ between a N-th reference block in the reference list L1 and an (N+1)-th reference block in the reference list L1 is zero. Accordingly, N reference block pairs can be generated based on the bilateral matching process. Each of the N reference block pairs can include a respective reference block in the reference list L0 and a respective reference block in the reference list L1. Each of the N reference block pairs can also include a respective distortion value that indicates a difference between the corresponding reference block in the reference list L0 and the corresponding reference block in the reference list L1.

According to the distortion values (or cost values) of the N reference block pairs, the current block can be predicted based on a best (or selected) reference block pair that has a minimum distortion value. For example, based on CPMVs associated with the selected reference block pair, an affine motion model can be determined. A block-level, a subblock-level, or a pixel-level prediction of the current block can further be performed based on the determined affine motion model.

It should be noted that each of the N reference blocks pairs can include a respective reference block in the first reference list L0 and a respective reference block in the second reference list L1. Each of the reference blocks in the first reference list L0 and the second reference list L1 can have a regular shape or an irregular shape. The regular shape can be a shape in which all the sides are equal and all the inside angles are equal. For example, the reference blocks can have a square shape. An irregular shape may not have equal sides or equal angles.

The iteration number of the bilateral matching process can be signaled in a bitstream or predefined based on one or more conditions. One or more additional constraints can be applied during the bilateral matching process. For example, a delta affine motion can further be required to be within in a certain range, such as within 2 pixels. In an embodiment, such a range can be signaled in bitstreams or predefined. The delta affine motion can be a difference between a current motion vector and a prior motion vector during the bilateral matching process. The delta affine motion can be in a sub-block level, a control point level, or a pixel level.

In the disclosure, a starting point (e.g., $P_{0,\ L0}(i, j)$ and $P_{0,\ L1}(i, j)$) of the bilateral matching process can be indicated by a predictor, such as a merge index, an AMVP predictor index, or even an affine motion indicated by an affine merge index.

In some embodiments, after the bilateral matching, the derived affine motion can be used as a motion for the current block directly. Alternatively, the affine motion may be used as a motion predictor for the current block.

In the disclosure, the bilateral matching process can be combined with existing coding modes, such as merge, affine/sub-block merge, MMVD, or GPM.

In an embodiment, an additional flag can be signaled in bitstreams to indicate whether the bilateral matching process is used.

In an embodiment, the bilateral matching process can always be on whenever a block (or current block) is bi-directional predicted.

In an embodiment, the bilateral matching process is always on whenever a block (or current block) is bi-directional predicted and is coded with affine mode.

In an embodiment, the bilateral matching process can be added to a candidate list and identified by an index. When the bilateral matching process is added to the candidate list, such as an affine candidate list, the CPMVs associated with the N reference block pairs and the starting points can function as candidates for the affine candidate list. The candidates can be inserted after SbTmvp, after inherited affine candidates, after constructed affine candidates, or after history-based candidates for example.

In some embodiments, the bilateral matching process can be used as a replacement or a generic form of another bilateral process, such as BDOF.

In the disclosure, a 3-parameter affine model or a 4-parameter affine model can be applied in the affine bilateral matching process. In an example, a 3-parameter scaling (or zooming) model can be applied in the affine bilateral matching process. The 3-parameter scaling model associated with reference list L0 can be simplified in equation (46), where $(1+\alpha)$ can be a scaling factor, and parameters (c, f) can represent the translational motion.

$$\begin{cases} mv_x = (1+\alpha)\cdot x + c \\ mv_y = (1+\alpha)\cdot y + f \end{cases} \qquad \text{Eq. (46)}$$

A symmetrical form of the 3-parameter scaling model associated with reference list L1 can be described in equation (47) as follow:

$$\begin{cases} mv'_x = (1-\alpha)\cdot x - c \\ mv'_y = (1-\alpha)\cdot y - f \end{cases} \qquad \text{Eq. (47)}$$

In an example, the 4-parameter affine model can include rotational transformation and translational motion (e.g., scaling factor r=1). Accordingly, the 4-parameter affine model associated with the reference list L0 can be simplified as follows in equation (48).

$$\begin{cases} mv_x = (\cos\theta - 1)x + \sin\theta y + c = ax + by + c \\ mv_y = -\sin\theta \cdot x + (\cos\theta - 1)y + f = -bx + ay + f \end{cases} \qquad \text{Eq. (48)}$$

where $\theta$ can denote an angle of rotation, and the translational motion can be represented by (c, f). A symmetrical form of the 4-parameter rotation model associated with reference list L1 can be shown in equation (49), where an opposite sign (e.g., a negative sign) can be applied to $\theta$, c, and f.

$$\begin{cases} mv_x = (\cos(-\theta) - 1)x + \sin(-\theta)y - c = ax - by - c \\ mv_y = -\sin(-\theta)x + (\cos(-\theta) - 1)y - f = bx + ay - f \end{cases} \qquad \text{Eq. (49)}$$

Based on the above affine models provided in equations (46)-(49), the affine bilateral matching can be achieved.

For example, a current iteration of the affine bilateral matching can be shown in equations (50) and (51). As shown in equations (50) and (51), $p_0$ and $p_1$ can denote predictions on the reference list L0 and the reference list L1, respectively. The $p_0$ and $p_1$ can be obtained from based CPMVs, or from a prior iteration. P'$_0$ and P'$_1$ can be refined predictions after the current iteration with $\Delta MV_0$ and $\Delta MV_1$ applied to each sample of a current block. The $\Delta MV_0$ can be associated with the reference list L0 and include a component $\Delta MV_{x0}$ in a x direction and a component $\Delta MV_{y0}$ in a y direction. The $\Delta MV_0$ can denote an affine motion vector difference between the current iteration and the prior iteration. $g_x$ and $g_y$ can be horizontal and vertical gradients of a prediction (e.g., $p_0$ or $p_1$).

$$p'_0 = p_0 + g_{x0} \cdot \Delta MV_{x0} + g_{y0} \cdot \Delta MV_{y0} \qquad \text{Eq. (50)}$$

$$p'_1 = p_1 + g_{x1} \cdot \Delta MV_{x1} + g_{y1} \cdot \Delta MV_{y1} \qquad \text{Eq. (51)}$$

The affine bilateral matching process can be performed to minimize a distortion between the refined predictions $p'_0$ and $p'_1$, such as a mean square error (MSE) of the two refined predictions $\Sigma(p'_0 - p'_1)^2$ after each iteration. Based on the symmetrical model linear functions that are shown in equations (46)-(49), the affine bilateral matching can become the same optimization process shown in affine ME of FIG. 16.

As shown in FIG. 16, the affine bilateral matching process can start from the initial CPMVs (or base CPMVs) of affine candidates. The initial CPMVs can be refined in a first iteration to generate updated CPMV values. In each iteration, an affine prediction can be generated based on the updated CPMV values. Similar to the affine motion estimation method provided in VTM software, a gradient based affine equation solving method can be applied in each iteration. A corresponding affine model can be used in the affine parameter derivation. New delta affine parameters (e.g., delta CPMVs) generated in each iteration can be applied to each reference list based on the symmetric models, such as the symmetric models in equations (46)-(49), to generate the updated CPMVs for both reference lists. The updated CPMVs can correspond to an updated reference block in the reference list (e.g., reference list L0 or L1).

In some embodiments, the iteration can terminate when the delta CPMVs (e.g., $\Delta MV_0$ or $\Delta MV_1$) are zero, or the iteration reach a pre-defined iteration number. In some embodiments, the constraints mentioned in equations (37-39) can be applied to the symmetric models in equations (46)-(49).

Figure 19:
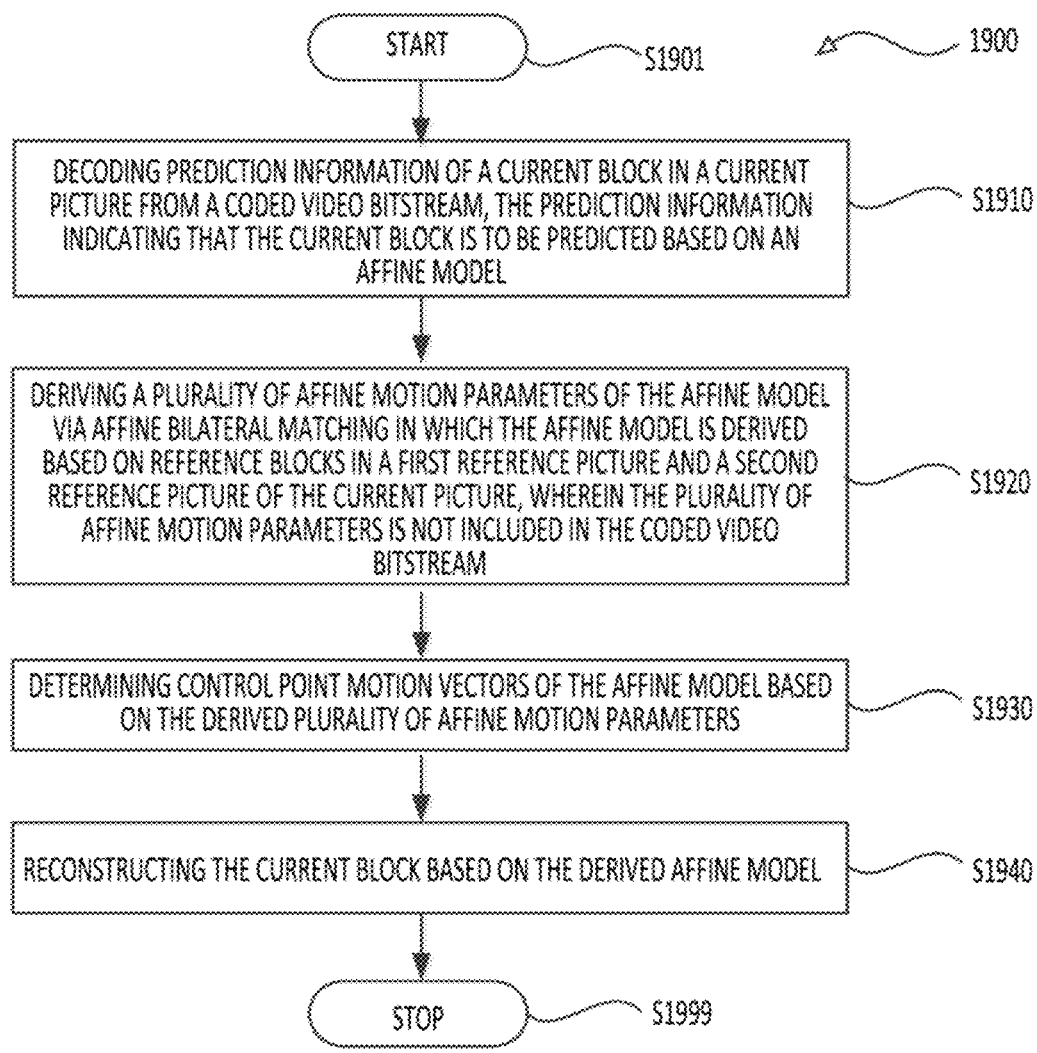
FIG. 19 shows a flow chart outlining an exemplary decoding process according to some embodiments of the disclosure.
Figure 20:
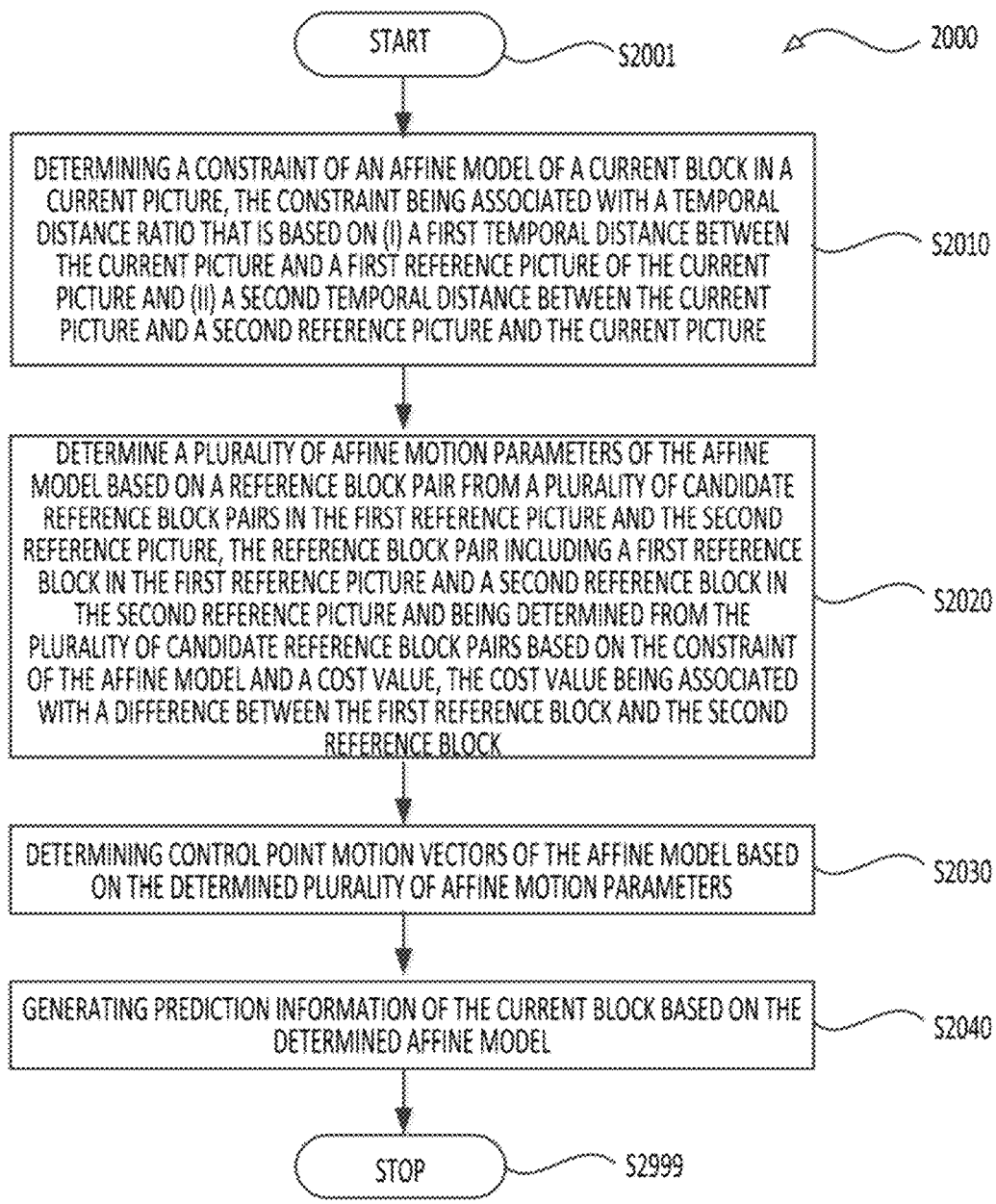
FIG. 20 shows a flow chart outlining an exemplary encoding process according to some embodiments of the disclosure.

FIG. 19 shows a flow chart outlining an exemplary decoding process (1900) according to some embodiments of the disclosure. FIG. 20 shows a flow chart outlining an exemplary encoding process (2000) according to some embodiments of the disclosure. The proposed processes may be used separately or combined in any order. Further, each of the processes (or embodiments), encoder, and decoder may be implemented by processing circuitry (e.g., one or more processors or one or more integrated circuits). In one example, the one or more processors execute a program that is stored in a non-transitory computer-readable medium.

Operations of processes (e.g., (1900) and (2000)) may be combined or arranged in any amount or order, as desired. In embodiments, two or more of the operations of the processes (e.g., (1900) and (2000)) may be performed in parallel.

The processes (e.g., (1900) and (2000)) can be used in the reconstruction and/or encoding of a block, so as to generate a prediction block for the block under reconstruction. In various embodiments, the processes (e.g., (1900) and (2000)) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the processes (e.g., (1900) and (2000)) are implemented in software instructions, thus when the processing circuitry executes the software instructions, the processing circuitry performs the processes (e.g., (1900) and (2000)).

As shown in FIG. 19, the process (1900) can start from (S1901) and proceed to (S1910). At (S1910), prediction information of a current block in a current picture can be decoded from a coded video bitstream, where the prediction information can indicate that the current block is to be predicted based on an affine model.

At (S1920), a plurality of affine motion parameters of the affine model can be derived via affine bilateral matching in which the affine model is derived based on reference blocks in a first reference picture and a second reference picture of the current picture. The plurality of affine motion parameters may not be included in the coded video bitstream.

At (S1930), control point motion vectors of the affine model can be determined based on the derived plurality of affine motion parameters.

At (S1940), the current block can be reconstructed based on the derived affine model.

The plurality of affine motion parameters of the affine model can be derived based on a reference block pair from a plurality of candidate reference block pairs of the reference blocks in the first reference picture and the second reference picture. The reference block pair can include a first reference block in the first reference picture and a second reference block in the second reference picture based on a constraint of the affine model and a cost value. The constraint can be associated with a temporal distance ratio that is based on (i) a first temporal distance between the current picture and the first reference picture and (ii) a second temporal distance between the current picture and the second reference picture. The cost value can be based on a difference between the first reference block and the second reference block.

In some embodiments, the temporal distance ratio can be equal to a product of a weight factor and a ratio of (i) the first temporal distance between the current picture and the first reference picture and (ii) the second temporal distance between the current picture and the second reference picture, where the weight factor can be a positive integer.

In some embodiments, the constraint of the affine model can indicate that a first translational factor of a first affine motion vector from the current block to the first reference block is proportional to the temporal distance ratio. The constraint of the affine model can indicate that a second translational factor of a second affine motion vector from the current block to the second reference block is proportional to the temporal distance ratio.

In some embodiments, the constraint of the affine model further can indicate that a second zoom factor of a second affine motion vector from the current block to the second reference block is equal to a first zoom factor of a first affine motion vector from the current block to the first reference block to a power of the temporal distance ratio.

In some embodiments, the constraint of the affine model can indicate that a ratio of (i) a first delta zoom factor of a first affine motion vector from the current block to the first reference block and (ii) a second delta zoom factor of a second affine motion vector from the current block to the second reference block is equal to the temporal distance ratio. The first delta zoom factor can be equal to a first zoom factor minus one, and the second delta zoom factor can be equal to a second zoom factor minus one.

In some embodiments, the constraint of the affine model can further indicate that a ratio of (i) a first rotation angle of a first affine motion vector from the current block to the first reference block and (ii) a second rotation angle of a second affine motion vector from the current block to the second reference block is equal to the temporal distance ratio.

To determine the reference block pair, the plurality of candidate reference block pairs can be determined according to the constraint of the affine model. Each candidate reference block pair of the plurality of candidate reference block pairs can include a respective candidate reference block in the first reference picture and a respective candidate reference block in the second reference picture. A respective cost value can be determined for each candidate reference block pair of the plurality of candidate reference block pairs. The reference block pair associated with a minimum cost value can be determined as a candidate reference block pair of the plurality of candidate reference block pairs.

In some embodiments, the plurality of candidate reference block pairs can include a first candidate reference block pair, where the first candidate reference block pair can include a first candidate reference block in the first reference picture and a first candidate reference block in the second reference picture. To determine the reference block pair, an initial predictor associated with the first reference picture for the current block can be determined based on an initial reference block in the first reference picture. An initial predictor associated with the second reference picture for the current block can be determined based on an initial reference block in the second reference picture. A first predictor associated with the first reference picture for the current block can be determined based on the initial predictor associated with the first reference picture for the current block, where the first predictor associated with the first reference picture for the current block can be associated with the first candidate reference block in the first reference picture. A first predictor associated with the second reference picture for the current block can be determined based on the initial predictor associated with the second reference picture for the current block, where the first predictor associated with the second reference picture for the current block can be associated with the first candidate reference block in the second reference picture. A first cost value can be determined based on a difference between the first predictor associated with the first reference picture for the current block and the first predictor associated with the second reference picture for the current block.

In the process (1900), the initial predictor associated with the first reference picture for the current block can be indicated by one of a merge index, an advanced motion vector prediction (AMVP) predictor index, and an affine merge index.

To determine the first predictor associated with the first reference picture for the current block, a first component of a gradient value of the initial predictor associated with the first reference picture for the current block in a first direction can be determined. A second component of the gradient value of the initial predictor associated with the first reference picture for the current block in a second direction can be determined. The second direction can be perpendicular to the first direction. A first component of a displacement between the initial reference block in the first reference picture and the first candidate reference block in the first reference picture in the first direction can be determined. A second component of the displacement between the initial reference block in the first reference picture and the first candidate reference block in the first reference picture in the second direction can be determined. The first predictor associated with the first reference picture for the current block can be determined as equal to a sum of (i) the initial predictor associated with the first reference picture for the current block, (ii) a product of the first component of the gradient value of the initial predictor and the first component of the displacement, and (iii) a product of the second component of the gradient value of the initial predictor and the second component of the displacement.

The plurality of candidate reference block pairs can include an N-th candidate reference block pair, where the N-th candidate reference block pair can include an N-th candidate reference block in the first reference picture and an N-th candidate reference block in the second reference picture. To determine the reference block pair, an N-th predictor associated with the N-th candidate reference block in the first reference picture for the current block can be determined based on an (N−1)-th predictor associated with an (N−1)-th candidate reference block in the first reference picture for the current block. An N-th predictor associated with the N-th candidate reference block in the second reference picture for the current block can be determined based on an (N−1)-th predictor associated with an (N−1)-th candidate reference block in the second reference picture for the current block. An N-th cost value can be determined based on a difference between the N-th predictor associated with the first reference picture for the current block and the N-th predictor associated with the second reference picture for the current block.

To determine the N-th predictor associated with the first reference picture for the current block, a first component of a gradient value of the (N−1)-th predictor associated with the first reference picture for the current block in a first direction can be determined. A second component of the gradient value of the (N−1)-th predictor associated with the first reference picture for the current block in a second direction can be determined. The second direction can be perpendicular to the first direction. A first component of a displacement can be determined. The first component of the displacement can be a difference between the N-th candidate reference block in the first reference picture and the (N−1)-th candidate reference block in the first reference picture in the first direction. A second component of the displacement can be determined. The second component of the displacement can be a difference between the N-th candidate reference block in the first reference picture and the (N−1)-th candidate reference block in the first reference picture in the second direction. The N-th predictor can be determined based on the first reference picture for the current block as equal to a sum of (i) the (N−1)-th predictor associated with the first reference picture for the current block, (ii) a product of the first component of the gradient value of the (N−1)-th predictor and the first component of the displacement, and (iii) a product of the second component of the gradient value of the (N−1)-th predictor and the second component of the displacement.

In some embodiments, the plurality of candidate reference block pairs can include N candidate reference block pairs based on one of: (i) N is equal to an upper limit value, and (ii) a displacement between the N-th candidate reference block in the first reference picture and an (N+1)-th candidate reference block in the first reference picture is zero.

In some embodiments, a delta motion vector of each sub-block in the current block can be equal to or less than a threshold value.

The prediction information can include a flag that indicates whether the current block is predicted based on the affine bilateral matching with the affine model.

In the process (1900), a candidate motion vector list for the affine model associated with the current block can be determined. The candidate motion vector list can include the control point motion vectors associated with the reference block pair.

After (S1950), the process proceeds to (S1999) and terminates.

The process (1900) can be suitably adapted. Step(s) in the process (1900) can be modified and/or omitted. Additional step(s) can be added. Any suitable order of implementation can be used.

As shown in FIG. 20, the process (2000) can start from (S2001) and proceed to (S2010). At (S2010), a constraint of an affine model of a current block in a current picture can be determined. The constraint can be associated with a temporal distance ratio that is based on (i) a first temporal distance between the current picture and a first reference picture of the current picture and (ii) a second temporal distance between the current picture and a second reference picture of the current picture.

At (S2020), a plurality of affine motion parameters of the affine model can be determined based on a reference block pair from a plurality of candidate reference block pairs in the first reference picture and the second reference picture. The reference block pair can include a first reference block in the first reference picture and a second reference block in the second reference picture. The reference block pair can be determined from the plurality of candidate reference block pairs based on the constraint of the affine model and a cost value. The cost value can be associated with a difference between the first reference block and the second reference block.

At (S2030), control point motion vectors of the affine model can be determined based on the determined plurality of affine motion parameters.

At (S2040), prediction information of the current block can be generated based on the determined affine model.

Then, the process proceeds to (S2099) and terminates.

The process (2000) can be suitably adapted. Step(s) in the process (2000) can be modified and/or omitted. Additional step(s) can be added. Any suitable order of implementation can be used.

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
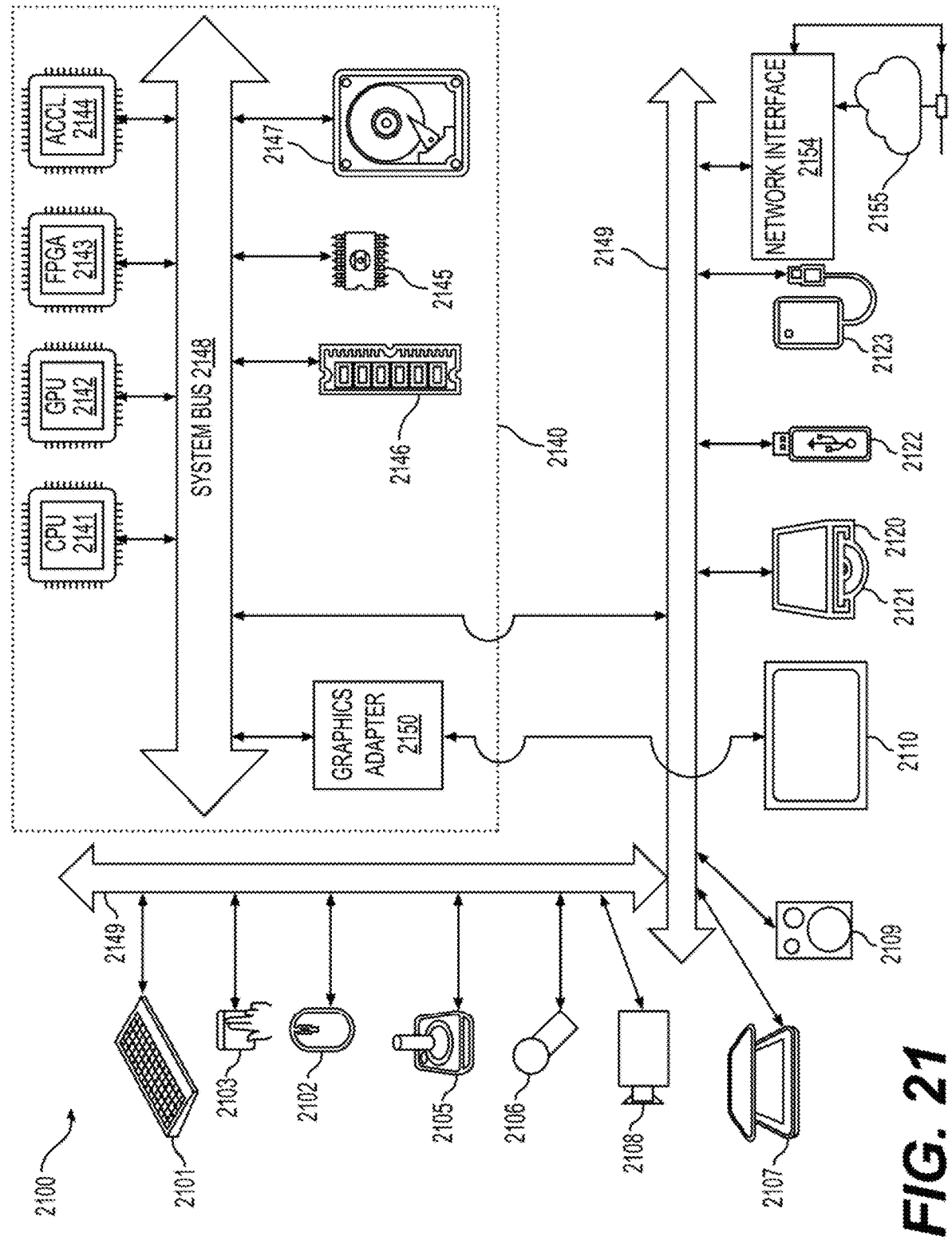
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface (2154) to one or more communication networks (2155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), graphics adapters (2150), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, the method comprising:
   decoding prediction information of a current block in a current picture from a coded video bitstream, the prediction information indicating that the current block is to be predicted based on an affine model;
   deriving a plurality of affine motion parameters of the affine model based on a reference block pair from a plurality of candidate reference block pairs in a first reference picture and a second reference picture, wherein
      the reference block pair includes a first reference block in the first reference picture and a second reference block in the second reference picture based on a constraint of the affine model and a cost value,
      the constraint is associated with a temporal distance ratio that is based on (i) a first temporal distance between the current picture and the first reference picture and (ii) a second temporal distance between the current picture and the second reference picture, and the cost value being based on a difference between the first reference block and the second reference block, and
      the plurality of affine motion parameters is not included in the coded video bitstream;
   determining control point motion vectors of the affine model based on the derived plurality of affine motion parameters; and
   reconstructing the current block based on the determined control point motion vectors of the affine model.

2. The method of claim 1, wherein the temporal distance ratio is equal to a product of a weight factor and a ratio of (i) the first temporal distance between the current picture and the first reference picture and (ii) the second temporal distance between the current picture and the second reference picture, the weight factor being a positive integer.

3. The method of claim 2, wherein the constraint of the affine model further comprises:
   a first translational factor of a first affine motion vector from the current block to the first reference block is proportional to the temporal distance ratio, and
   a second translational factor of a second affine motion vector from the current block to the second reference block is proportional to the temporal distance ratio.

4. The method of claim 2, wherein the constraint of the affine model further comprises:
   a second zoom factor of a second affine motion vector from the current block to the second reference block is equal to a first zoom factor of a first affine motion vector from the current block to the first reference block to a power of the temporal distance ratio.

5. The method of claim 2, wherein the constraint of the affine model further comprises:
   a ratio of (i) a first delta zoom factor of a first affine motion vector from the current block to the first reference block and (ii) a second delta zoom factor of a second affine motion vector from the current block to the second reference block is equal to the temporal distance ratio,
   the first delta zoom factor is equal to a first zoom factor minus one, and
   the second delta zoom factor is equal to a second zoom factor minus one.

6. The method of claim 2, wherein the constraint of the affine model further comprises:
   a ratio of (i) a first rotation angle of a first affine motion vector from the current block to the first reference block and (ii) a second rotation angle of a second affine motion vector from the current block to the second reference block is equal to the temporal distance ratio.

7. The method of claim 1, wherein the deriving the plurality of affine motion parameters further comprises:
   determining the plurality of candidate reference block pairs according to the constraint of the affine model, each candidate reference block pair of the plurality of candidate reference block pairs including a respective candidate reference block in the first reference picture and a respective candidate reference block in the second reference picture;
   determining a respective cost value for each candidate reference block pair of the plurality of candidate reference block pairs; and
   determining the reference block pair as a candidate reference block pair of the plurality of candidate reference block pairs that is associated with a minimum cost value.

8. The method of claim 7, wherein:
   the plurality of candidate reference block pairs includes a first candidate reference block pair, the first candidate reference block pair including a first candidate reference block in the first reference picture and a first candidate reference block in the second reference picture, and
   the deriving the plurality of affine motion parameters further comprises:
      determining an initial predictor associated with the first reference picture for the current block based on an initial reference block in the first reference picture;
      determining an initial predictor associated with the second reference picture for the current block based on an initial reference block in the second reference picture;
      determining a first predictor associated with the first reference picture for the current block based on the initial predictor associated with the first reference picture for the current block, the first predictor associated with the first reference picture for the current block being associated with the first candidate reference block in the first reference picture;
      determining a first predictor associated with the second reference picture for the current block based on the initial predictor associated with the second reference picture for the current block, the first predictor associated with the second reference picture for the current block being associated with the first candidate reference block in the second reference picture; and
      determining a first cost value based on a difference between the first predictor associated with the first reference picture for the current block and the first predictor associated with the second reference picture for the current block.

9. The method of claim 8, wherein the initial predictor associated with the first reference picture for the current block is indicated by one of a merge index, an advanced motion vector prediction (AMVP) predictor index, and an affine merge index.

10. The method of claim 8, wherein the determining the first predictor associated with the first reference picture for the current block further comprises:

determining a first component of a gradient value of the initial predictor associated with the first reference picture for the current block in a first direction;

determining a second component of the gradient value of the initial predictor associated with the first reference picture for the current block in a second direction, the second direction being perpendicular to the first direction;

determining a first component of a displacement between the initial reference block in the first reference picture and the first candidate reference block in the first reference picture in the first direction;

determining a second component of the displacement between the initial reference block in the first reference picture and the first candidate reference block in the first reference picture in the second direction; and determining the first predictor associated with the first reference picture for the current block as equal to a sum of (i) the initial predictor associated with the first reference picture for the current block, (ii) a product of the first component of the gradient value of the initial predictor and the first component of the displacement, and (iii) a product of the second component of the gradient value of the initial predictor and the second component of the displacement.

11. The method of claim 7, wherein:

the plurality of candidate reference block pairs includes an N-th candidate reference block pair, the N-th candidate reference block pair including an N-th candidate reference block in the first reference picture and an N-th candidate reference block in the second reference picture, and the deriving the plurality of affine motion parameters further comprises:

determining an N-th predictor associated with the N-th candidate reference block in the first reference picture for the current block based on an (N−1)-th predictor associated with an (N−1)-th candidate reference block in the first reference picture for the current block;

determining an N-th predictor associated with the N-th candidate reference block in the second reference picture for the current block based on an (N−1)-th predictor associated with an (N−1)-th candidate reference block in the second reference picture for the current block; and determining an N-th cost value based on a difference between the N-th predictor associated with the first reference picture for the current block and the N-th predictor associated with the second reference picture for the current block.

12. The method of claim 11, wherein the determining the N-th predictor associated with the first reference picture for the current block further comprises:

determining a first component of a gradient value of the (N−1)-th predictor associated with the first reference picture for the current block in a first direction;

determining a second component of the gradient value of the (N−1)-th predictor associated with the first reference picture for the current block in a second direction, the second direction being perpendicular to the first direction;

determining a first component of a displacement between the N-th candidate reference block in the first reference picture and the (N−1)-th candidate reference block in the first reference picture in the first direction;

determining a second component of the displacement between the N-th candidate reference block in the first reference picture and the (N−1)-th candidate reference block in the first reference picture in the second direction; and determining the N-th predictor based on the first reference picture for the current block as equal to a sum of (i) the (N−1)-th predictor associated with the first reference picture for the current block, (ii) a product of the first component of the gradient value of the (N−1)-th predictor and the first component of the displacement, and (iii) a product of the second component of the gradient value of the (N−1)-th predictor and the second component of the displacement.

13. The method of claim 12, wherein the plurality of candidate reference block pairs includes N candidate reference block pairs based on one of:

(i) N is equal to an upper limit value, and (ii) a displacement between the N-th candidate reference block in the first reference picture and an (N+1)-th candidate reference block in the first reference picture is zero.

14. The method of claim 12, wherein a delta motion vector of each sub-block in the current block is equal to or less than a threshold value.

15. The method of claim 1, wherein the prediction information includes a flag that indicates whether the current block is predicted based on an affine bilateral matching with the affine model.

16. The method of claim 1, further comprising:

determining a candidate motion vector list for the affine model associated with the current block, the candidate motion vector list including the control point motion vectors associated with the reference block pair.

17. A method of processing visual media data, the method comprising:

processing a bitstream that includes the visual media data according to a format rule, wherein the bitstream includes prediction information of a current block in a current picture, the prediction information indicating that the current block is to be predicted based on an affine model;

the format rule specifies that:

a plurality of affine motion parameters of the affine model is derived based on a reference block pair from a plurality of candidate reference block pairs in a first reference picture and a second reference picture, the reference block pair including a first reference block in the first reference picture and a second reference block in the second reference picture based on a constraint of the affine model and a cost value, the constraint being associated with a temporal distance ratio that is based on (i) a first temporal distance between the current picture and the first reference picture and (ii) a second temporal distance between the current picture and the second reference picture, and the cost value being based on a difference between the first reference block and the second reference block, control point motion vectors of the affine model are determined based on the derived plurality of affine motion parameters, and the current block in the bitstream is processed based on the determined control point motion vectors of the affine model; and the plurality of affine motion parameters is not included in the bitstream.

18. The method of claim 17, wherein the format rule further specifies that:

the temporal distance ratio is equal to a product of a weight factor and a ratio of (i) the first temporal distance between the current picture and the first reference picture and (ii) the second temporal distance between the current picture and the second reference picture, the weight factor being a positive integer.

19. A method for video encoding in a video encoder, the method comprising:

determining current block in a current picture is to be predicted based on an affine model;

deriving a plurality of affine motion parameters of the affine model based on a reference block pair from a plurality of candidate reference block pairs in a first reference picture and a second reference picture, the reference block pair including a first reference block in the first reference picture and a second reference block in the second reference picture based on a constraint of the affine model and a cost value, the constraint being associated with a temporal distance ratio that is based on (i) a first temporal distance between the current picture and the first reference picture and (ii) a second temporal distance between the current picture and the second reference picture, and the cost value being based on a difference between the first reference block and the second reference block, determining control point motion vectors of the affine model based on the derived plurality of affine motion parameters; and encoding the current block in a video bitstream based on the determined control point motion vectors of the affine model, wherein the plurality of affine motion parameters is not included in the video bitstream.

20. The method according to claim 17, wherein the temporal distance ratio is equal to a product of a weight factor and a ratio of (i) the first temporal distance between the current picture and the first reference picture and (ii) the second temporal distance between the current picture and the second reference picture, the weight factor being a positive integer.

* * * * *